US010096289B2

(12) United States Patent
Lee et al.

(10) Patent No.: US 10,096,289 B2
(45) Date of Patent: Oct. 9, 2018

(54) DISPLAY APPARATUS WITH ADJUSTED APERTURE RATIO

(71) Applicant: Samsung Display Co., Ltd., Yongin, Gyeonggi-Do (KR)

(72) Inventors: Sunhwa Lee, Yongin-si (KR); Kwang-chul Jung, Seongnam-si (KR); Sang-Uk Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 100 days.

(21) Appl. No.: 14/734,934

(22) Filed: Jun. 9, 2015

(65) Prior Publication Data

US 2016/0055807 A1 Feb. 25, 2016

(30) Foreign Application Priority Data

Aug. 19, 2014 (KR) ........................ 10-2014-0107850

(51) Int. Cl.

| | |
|---|---|
| *G09G 5/00* | (2006.01) |
| *G09G 3/36* | (2006.01) |
| *G02F 1/1343* | (2006.01) |
| *G09G 5/02* | (2006.01) |
| *G09G 5/18* | (2006.01) |

(52) U.S. Cl.
CPC ......... *G09G 3/36* (2013.01); *G02F 1/134336* (2013.01); *G09G 5/02* (2013.01); *G09G 5/18* (2013.01); *G02F 2001/134345* (2013.01); *G02F 2201/40* (2013.01); *G02F 2201/52* (2013.01); *G09G 2300/0426* (2013.01)

(58) Field of Classification Search
CPC ... H01L 27/326; H01L 27/32; H01L 27/3213; G09G 2300/0452; G02F 2201/52; G02F 1/136213; G02F 2001/134345
USPC .................................................. 345/694, 695
See application file for complete search history.

(56) References Cited

U.S. PATENT DOCUMENTS

| | | | |
|---|---|---|---|
| 4,828,365 A | 5/1989 | Stewart et al. | |
| 7,196,745 B2* | 3/2007 | Enda | G02F 1/136286 349/143 |
| 9,190,001 B2* | 11/2015 | Kamada | G09G 3/3648 |

(Continued)

FOREIGN PATENT DOCUMENTS

| | | |
|---|---|---|
| JP | 11242244 A | 9/1999 |
| JP | 2005-129504 | 5/2005 |

(Continued)

*Primary Examiner* — Yuzhen Shen
(74) *Attorney, Agent, or Firm* — Innovation Counsel LLP

(57) ABSTRACT

A display apparatus with improved aperture ratio and light transmittance is presented. The apparatus has a pixel group that includes a first pixel including first and second sub-regions, a second pixel including third and fourth sub-regions, and a third pixel including fifth and sixth sub-regions. The first, second, and third pixels are sequentially arranged in a first direction and at least two sub-regions of the first, third, and fifth sub-regions have different widths in the first direction. The second, fourth, and sixth sub-regions are sequentially arranged in the first direction, and at least one sub-region of the second, fourth, and sixth sub-regions expands toward an adjacent sub-region in the first direction and has a width greater than a width of the other sub-regions of the second, fourth, and sixth sub-regions in the same pixel group.

16 Claims, 16 Drawing Sheets

(56) References Cited

U.S. PATENT DOCUMENTS

| | | | |
|---|---|---|---|
| 2010/0283714 A1* | 11/2010 | Cho | G09G 3/3607 345/90 |
| 2011/0090446 A1 | 4/2011 | Kim et al. | |
| 2012/0057091 A1* | 3/2012 | Kawabata | G09G 3/3655 349/38 |
| 2012/0194573 A1* | 8/2012 | Yamashita | G09G 3/3614 345/690 |
| 2012/0299898 A1* | 11/2012 | Yamashita | G02F 1/136213 345/211 |
| 2013/0070002 A1 | 3/2013 | Hisada et al. | |
| 2013/0135845 A1* | 5/2013 | Matsui | G09F 13/04 362/97.1 |
| 2013/0235289 A1* | 9/2013 | Yamaguchi | G02F 1/13306 349/33 |
| 2015/0311261 A1* | 10/2015 | Choi | H01L 27/322 257/40 |

FOREIGN PATENT DOCUMENTS

| | | |
|---|---|---|
| JP | 2005-129505 | 5/2005 |
| JP | 2010-243522 | 10/2010 |
| JP | 2010-266869 | 11/2010 |
| KR | 10-2004-0021168 A | 3/2004 |
| WO | 2012093621 A1 | 7/2012 |

\* cited by examiner

DISPLAY APPARATUS WITH ADJUSTED APERTURE RATIO

CROSS-REFERENCE TO RELATED APPLICATION

This U.S. non-provisional patent application claims priority under 35 U.S.C. § 119 of Korean Patent Application No. 10-2014-0107850, filed on Aug. 19, 2014, the content of which are hereby incorporated by reference in its entirety.

BACKGROUND

1. Field of Disclosure

The present disclosure relates to a display apparatus. More particularly, the present disclosure relates to a display apparatus capable of improving aperture ratio and light transmittance.

2. Description of the Related Art

In general, a liquid crystal display device includes an upper substrate on which a transparent electrode is disposed, a lower substrate facing the upper substrate, a liquid crystal layer disposed between the upper and lower substrates, and upper and lower polarizers respectively disposed on outer surfaces of the upper and lower substrates. The liquid crystal display device changes the alignment of liquid crystal molecules in the liquid crystal layer to control light transmittance of the liquid crystal layer, thereby displaying a desired image.

In addition, the liquid crystal display device includes color filters of three primary colors, e.g., red, green, and blue colors, which enable a color image to be displayed. However, color coordinates of the liquid crystal display device are varied depending on the transmittance of each of the red, green, and blue color filters. Hence, an area ratio between the red, green, and blue color filters or between pixel electrodes of the liquid crystal display device is adjusted to ensure a production of desired color coordinates.

SUMMARY

The present disclosure provides a display apparatus capable of improving aperture ratio and light transmittance.

Embodiments of the inventive concept provide a display apparatus including a first pixel including first and second sub-regions, a second pixel including third and fourth sub-regions, and a third pixel including fifth and sixth sub-regions.

The first, second, and third pixels are sequentially arranged in a first direction and at least two sub-regions of the first, third, and fifth sub-regions have different widths in the first direction.

The second, fourth, and sixth sub-regions are sequentially arranged in the first direction, and at least one sub-region of the second, fourth, and sixth sub-regions expands toward sub-region in the first direction and has a width greater than a width of the other sub-regions of the second, fourth, and sixth sub-regions in the same pixel.

Embodiments of the inventive concept provide a display apparatus including a first dot including first, second, and third pixels, at least two pixels of the first, second, and third pixels having different widths in a first direction, and a second dot including fourth, fifth, and sixth pixels, at least two pixels of the fourth, fifth, and sixth pixels having different widths in a first direction.

Each of the first, second, third, fourth, fifth, and sixth pixels includes a first sub-region and a second sub-region, and at least one second sub-region of the second sub-regions of the first, second, third, fourth, fifth, and sixth pixels extends toward an adjacent pixel and have a width greater than a width of the first sub-region in the same pixel.

According to the above, among the sub-regions, one sub-region may extend into a recessed portion of the adjacent pixel to efficiently utilize available space. That is, the sub-region of the pixel having the relatively small horizontal width is disposed in the available spaced of the pixel having the relatively large horizontal width, and the pixels share the available space.

Thus, the aperture ratio of the pixel having the relatively small pixel width may be prevented from decreasing, and as a result, the transmittance of the display apparatus may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
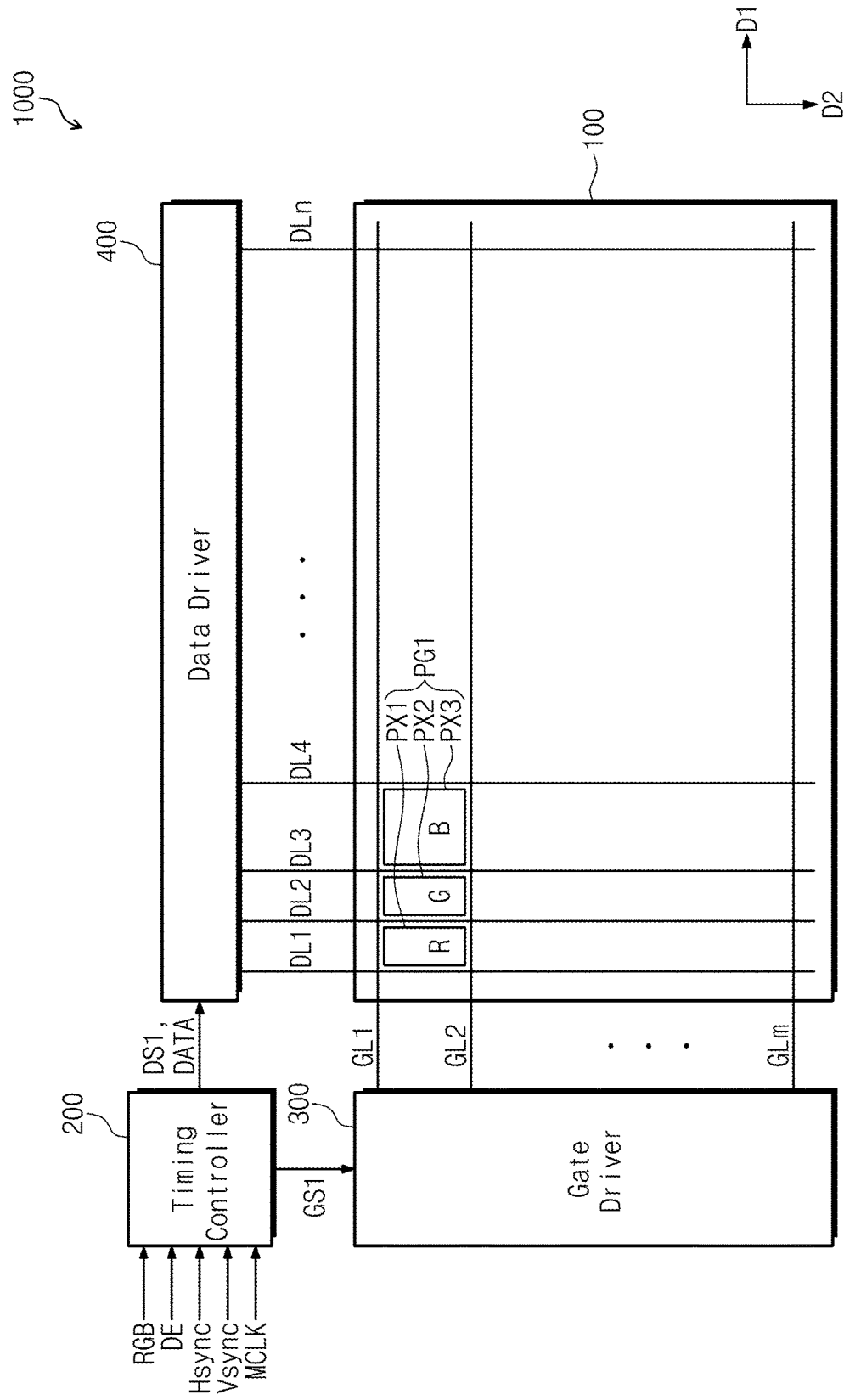
FIG. 1 is a block diagram showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present inventive concept will be explained in detail with reference to the accompanying drawings. A "width," as used herein, is intended to mean either the "horizontal width" or the "vertical length." A "first direction," as used herein, is intended to mean either a row direction D1 or a column direction D2.

FIG. 1 is a block diagram showing a display apparatus 1000 according to an exemplary embodiment of the present disclosure.

Referring to FIG. 1, the display apparatus 1000 includes a display panel 100, a timing controller 200, a gate driver 300, and a data driver 400.

The display panel 100 may be, but is not limited to, a liquid crystal display panel configured to include a lower substrate, an upper substrate facing the lower substrate, and a liquid crystal layer interposed between the lower substrate and the upper substrate.

The display panel 100 includes a plurality of gate lines GL1 to GLm extending in a row direction D1 and a plurality of data lines DL1 to DLn extending in a column direction D2 crossing the row direction D1. The display panel 100 includes a plurality of pixel groups PG arranged in the row direction D1 and the column direction D2. Each of the pixel groups PG includes a first pixel PX1, a second pixel PX2, and a third pixel PX3, and the first, second, and third pixels PX1, PX2, and PX3 are sequentially arranged in the row direction D1. The first, second, and third pixels PX1, PX2, and PX3 are connected to the same gate line, e.g., a first gate line GL1, and connected to different data lines, e.g., first, second, and third data lines DL1, DL2, and DL3, respectively.

The first, second, and third pixels PX1, PX2, and PX3 respectively include red, green, and blue color filters, but they should not be limited thereto. That is, the first, second, and third pixels PX1, PX2, and PX3 may display other colors, e.g., white, yellow, cyan, magenta, etc.

The timing controller 200 receives image data RGB and control signals from an external graphic controller (not shown). The control signals include a vertical synchronization signal Vsync as a frame distinction signal, a horizontal synchronization signal Hsync as a row distinction signal, a data enable signal DE that defines a period in which data are input, and a main clock signal MCLK. The data enable signal DE maintains a high level only during a period in which the data are output.

The timing controller 200 converts the image data RGB by taking specifications of the data driver 400 into consideration and applies the converted image data to the data driver 400. The timing controller 200 generates a data control signal DS1 and a gate control signal GS1 on the basis of the control signals. The timing controller 200 applies the gate control signal GS1 to the gate driver 300 and applies the data control signal DS1 to the data driver 400. The gate control signal GS1 is used to drive the gate driver 300 and the data control signal DS1 is used to drive the data driver 400.

The gate driver 300 generates gate signals in response to the gate control signal GS1 and applies the gate signals to the gate lines GL1 to GLm. The gate control signal GS1 includes a scanning start signal to indicate the start of the scanning, at least one clock signal to control an output period of a gate-on voltage, and an output enable signal to control a maintaining time of the gate-on voltage.

The data driver 400 generates grayscale voltages corresponding to the image data in response to the data control signal DS1 and applies the grayscale voltages to the data lines DL1 to DLn as data voltages. The data voltages include a positive data voltage having a positive value with respect to a common voltage and a negative data voltage having a negative value with respect to the common voltage. The data control signal DS1 includes a horizontal start signal STH to indicate a start of transmission of the image data DATA to the data driver 400, a load signal to indicate application of the data voltages to the data lines DL1 to DLn, and an inverting signal to invert a polarity of the data voltages with respect to the common voltage.

Each of the timing controller 200, the gate driver 300, and the data driver 400 is directly mounted on the display panel 100 in the form of integrated circuit chip, attached to the display panel 100 in the form of tape carrier package after being mounted on a flexible printed circuit board, or mounted on a separate printed circuit board. Different from the above ways, at least one of the gate driver 300 and the data driver 400 may be directly integrated on the display panel 100 together with the gate lines GL1 to GLm and the data lines DL1 to DLn. In addition, the timing controller 200, the gate driver 300, and the data driver 400 may be integrated in the form of a single chip.

Figure 2:
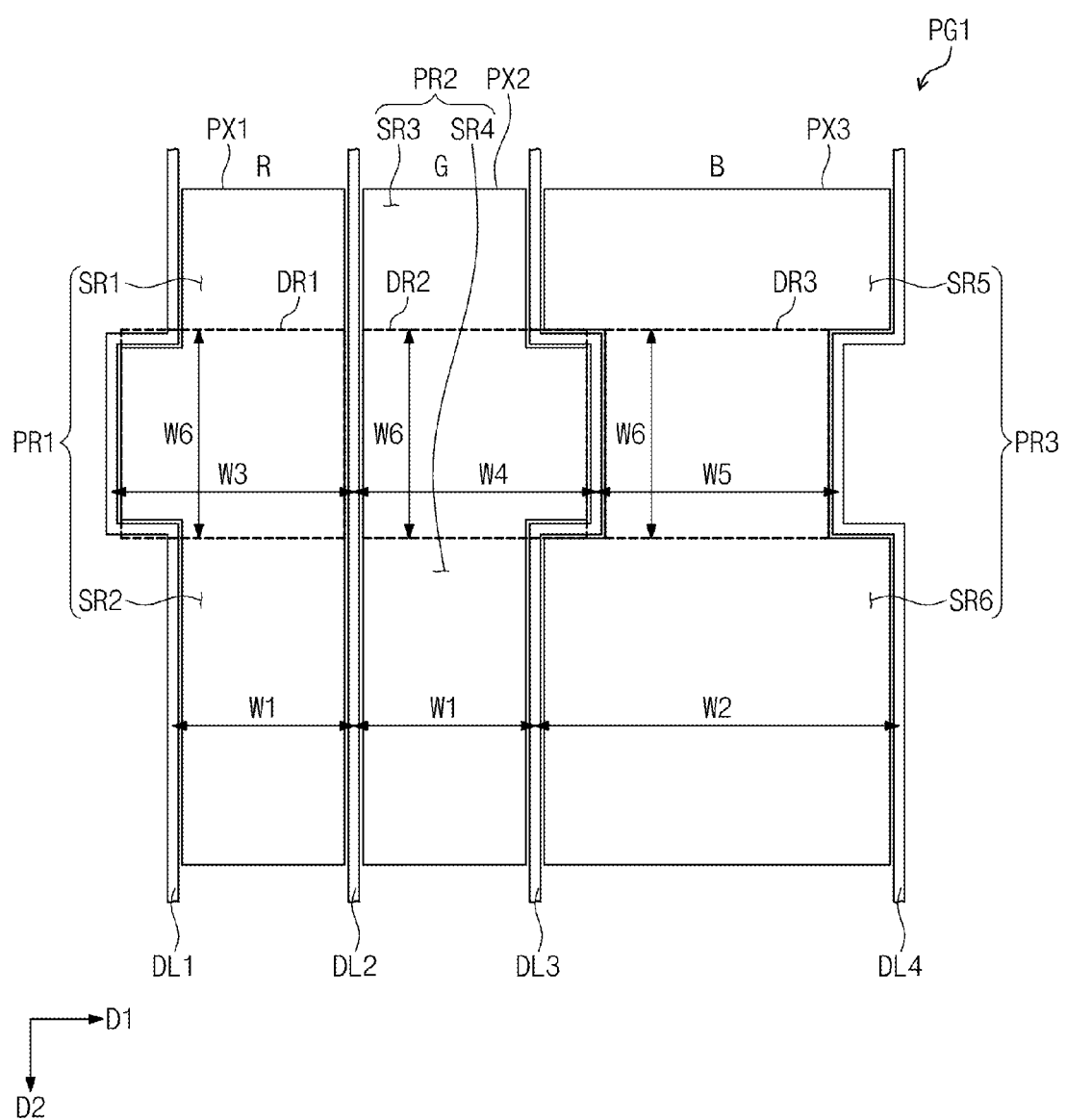
FIG. 2 is a plan view showing a first pixel group of a display panel according to an exemplary embodiment of the present disclosure.

FIG. 2 is a plan view showing a first pixel group of a display panel according to an exemplary embodiment of the present disclosure. In the present exemplary embodiment, different pixel groups PG have substantially the same structure and function. Thus, for clarity of illustration, FIG. 2 shows only a first pixel group PG1 among the pixel groups PG and details of others will be omitted.

Referring to FIG. 2, the first pixel group PG1 includes the first pixel PX1, the second pixel PX2, and the third pixel PX3, which are sequentially arranged in the row direction D1. The first pixel PX1 is disposed between the first and second data lines DL1 and DL2 and connected to the first data line DL1, the second pixel PX2 is disposed between the second and third data lines DL2 and DL3 and connected to the second data line DL2, and the third pixel PX3 is disposed between the third and fourth data lines DL3 and DL4 and connected to the third data line DL3.

The first pixel PX1 displays a first color, e.g., a red color R, the second pixel PX2 displays a second color, e.g., a green color G, and the third pixel PX3 displays a third color, e.g., a blue color B. However, the colors displayed by the first, second, and third pixels PX1, PX2, and PX3 should not be limited thereto or thereby. Among the first, second, and third pixels PX1, PX2, and PX3, at least one pixel has a size greater than that of others. In the example of FIG. 2, the third pixel PX3 displaying the blue color is larger than that of the first and second pixels PX1 and PX2 as shown, but it should not understood that this is not a limitation of the inventive concept. That is, according to embodiments, the first pixel PX1 may be larger than the second and third pixels PX2 and PX3, or the second pixel PX2 may be larger than that of the first and third pixels PX1 and PX3. In some embodiments, the three pixels PX1, PX2, PX3 may all have different sizes.

Hereinafter, the structure where the third pixel PX3 is greater than the first and second pixels PX1 and PX2 will be described in detail.

The first pixel PX1 includes a first sub-region PR1 and a second sub-region DR1, the second pixel PX2 includes a third sub-region PR2 and a fourth sub-region DR2, and the third pixel PX3 includes a fifth sub-region PR3 and a sixth sub-region DR3. Among the first, third, and fifth sub-regions PR1, PR2, and PR3, at least two sub-regions have different widths in the row direction D1. Hereinafter, the width in the row direction D1 will be referred to as a horizontal width.

As an example, the horizontal width is a distance between a center of a width in the row direction D1 of the data line disposed at one side of a corresponding pixel and a center of a width in the row direction D1 of the data line disposed at the other side of the corresponding pixel. In other words, the horizontal width of the first pixel PX1 corresponds to the distance between the center of the width in the row direction D1 of the first data line DL1 and the center of the width in the row direction D1 of the second data line DL2.

In the present exemplary embodiment, each of the first and third sub-regions PR1 and PR2 has a first horizontal width W1 and the fifth sub-region PR3 has a second horizontal width W2 greater than the first horizontal width W1. The second horizontal width W2 may be two times greater than the first horizontal width W1.

The second, fourth, and sixth sub-regions DR1, DR2, and DR3 are sequentially arranged in the row direction D1 and the horizontal width of at least one of the second, fourth, and sixth sub-regions DR1, DR2, and DR3 is different from those of others. The second, fourth, and sixth sub-regions DR1, DR2, and DR3 have third, fourth, and fifth horizontal widths W3, W4, and W5, respectively. The third and fourth horizontal widths W3 and W4 are different from the first horizontal width W1, and the fifth horizontal width W5 is different from the second horizontal width W2. As an example, the third and fourth horizontal widths W3 and W4 are greater than the first horizontal width W1, and the fifth horizontal width W5 is smaller than the second horizontal width W2.

In addition, the horizontal widths W3, W4, and W5 of the second, fourth, and sixth sub-regions DR1, DR2, and DR3 are substantially same with each other. The second, fourth, and sixth sub-regions DR1, DR2, and DR3 have substantially the same vertical length W6.

The first sub-region PR1 is divided into two regions in the column direction D2 and includes first and second sub-pixel regions SR1 and SR2. Although not shown in FIG. 2, the first sub-pixel region SR1 includes a first sub-pixel electrode and the second sub-pixel region SR2 includes a second sub-pixel electrode. The second sub-region DR1 is disposed between the first and second sub-pixel regions SR1 and SR2. A driving device, e.g., a thin film transistor, may be disposed in the second sub-region DR1 to drive the first and second sub-pixel electrodes. Accordingly, since no image is displayed in the second sub-region DR1, the second sub-region DR1 may be covered by a black matrix (not shown).

The first and second sub-pixel regions SR1 and SR2 have the first width W1 as their horizontal width. The vertical length of the first sub-pixel region SR1 is different from that of the second sub-pixel region SR2. For instance, the vertical length of the second sub-pixel region SR2 is greater than the vertical length of the first sub-pixel region SR1. Here, the vertical length of the first sub-pixel region SR1 may correspond to the vertical length of the first sub-pixel electrode and the vertical length of the second sub-pixel region SR2 may correspond to the vertical length of the second sub-pixel electrode.

The third sub-region PR2 is divided into two regions in the column direction D2 and includes third and fourth sub-pixel regions SR3 and SR4. Although not shown in FIG. 2, the third sub-pixel region SR3 includes a third sub-pixel electrode and the fourth sub-pixel region SR4 includes a fourth sub-pixel electrode. The fourth sub-region DR2 is disposed between the third and fourth sub-pixel regions SR3 and SR4. A driving device, e.g., a thin film transistor, may be disposed in the fourth sub-region DR2 to drive the third and fourth sub-pixel electrodes. Therefore, since no image is displayed in the fourth sub-region DR2, the fourth sub-region DR2 may be covered by the black matrix (not shown).

The third and fourth sub-pixel regions SR3 and SR4 have the first width W1 as their horizontal width. The vertical length of the third sub-pixel region SR3 is different from that of the fourth sub-pixel region SR4. For instance, the vertical length of the fourth sub-pixel region SR4 is greater than the vertical length of the third sub-pixel region SR3. Here, the vertical length of the third sub-pixel region SR3 may correspond to the vertical length of the third sub-pixel electrode and the vertical length of the fourth sub-pixel region SR4 may correspond to the vertical length of the fourth sub-pixel electrode.

The fifth sub-region PR3 is divided into two regions in the column direction D2 and includes fifth and sixth sub-pixel regions SR5 and SR6. Although not shown in FIG. 2, the fifth sub-pixel region SR5 includes a fifth sub-pixel electrode and the sixth sub-pixel region SR6 includes a sixth sub-pixel electrode. The sixth sub-region DR3 is disposed between the fifth and sixth sub-pixel regions SR5 and SR6. A driving device, e.g., a thin film transistor, may be disposed in the sixth sub-region DR3 to drive the fifth and sixth sub-pixel electrodes. Thus, since no image is displayed in the sixth sub-region DR3, the sixth sub-region DR3 may be covered by the black matrix (not shown).

The fifth and sixth sub-pixel regions SR5 and SR6 have the second width W2 as their horizontal width. The vertical length of the fifth sub-pixel region SR5 is different from that of the sixth sub-pixel region SR6. For instance, the vertical length of the sixth sub-pixel region SR6 is greater than the vertical length of the fifth sub-pixel region SR5. Here, the vertical length of the fifth sub-pixel region SR5 may correspond to the vertical length of the fifth sub-pixel electrode and the vertical length of the sixth sub-pixel region SR6 may correspond to the vertical length of the sixth sub-pixel electrode.

The first, third, and fifth sub-pixel regions SR1, SR3, and SR5 are sequentially arranged in the row direction D1 and have the same vertical length. The second, fourth, and sixth sub-pixel regions SR2, SR4, and SR6 are sequentially arranged in the row direction D1 and have the same vertical length.

The second sub-region DR1 has the horizontal width W3 greater than the horizontal width W1 of the first and second sub-pixel regions SR1 and SR2. Accordingly, the first pixel PX1 has a shape in which the second sub-region DR1 protrudes in the horizontal direction, such that in the view of FIG. 2, the left side of the second sub-region DR1 is not flush with the left side of the first sub-region PR1. The fourth sub-region DR2 has the horizontal width W4 greater than the horizontal width W1 of the third and fourth sub-pixel regions SR3 and SR4. Therefore, the second pixel PX2 has a shape in which the fourth sub-region DR2 protrudes in the horizontal direction, such that in the view of FIG. 2, the right side of the fourth sub-region DR2 is not flush with the right side of the third sub-region PR2.

Here, the second sub-region DR1 of the first pixel PX1 and the fourth sub-region DR2 of the second pixel PX2 protrude in opposite directions.

The sixth sub-region DR3 has the horizontal width W5 smaller than the horizontal width W2 of the fifth and sixth sub-pixel regions SR5 and SR6. Therefore, the third pixel PX3 has a shape in which the sixth sub-region DR3 is recessed to look as though edge portions have been carved out of the sixth sub-region DR3 in plan view. In reference to FIG. 2, left and right side portions of the third pixel PX3 are cutout to form a sixth sub-region DR3 that is narrower than the fifth sub-region PR3. The fourth sub-region DR2 of the second pixel PX2 and a second sub-region DR1 of a first pixel PX1 of an adjacently-positioned pixel group are respectively accommodated in the left and right recessed side portions of the third pixel PX3. Thus, the second and fourth sub-regions DR1 and DR2 extend to the adjacent pixel, e.g., the third pixel PX3, to share the available space of the adjacent pixel. That is, a driving region of the pixel having the relatively small horizontal width extends in the available space of the pixel having the relatively large horizontal width, and thus the pixels are disposed to share the spaces thereof.

Accordingly, the vertical length of the second and fourth sub-regions DR1 and DR2 may be prevented from increasing, and as a result, the aperture ratio of the first and second pixels PX1 and PX2 may be improved.

Figure 3:
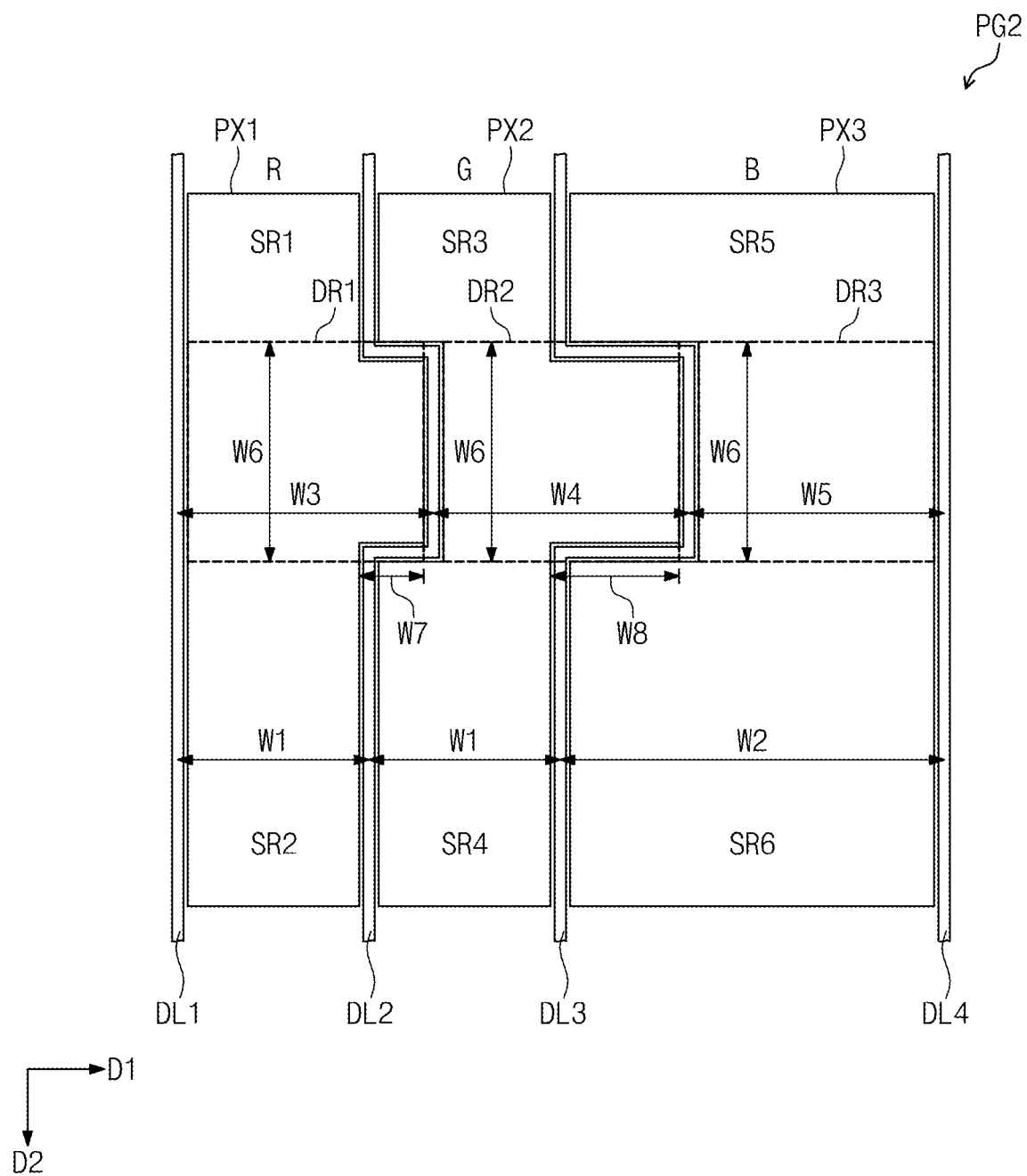
FIG. 3 is a plan view showing a first pixel group of a display panel according to another exemplary embodiment of the present disclosure.

FIG. 3 is a plan view showing a first pixel group of a display panel according to another exemplary embodiment of the present disclosure. In the present exemplary embodiment, the pixel groups PG have the same structure and function, and thus FIG. 3 shows a first pixel group PG2 as a representative example, and details of others will be omitted.

Referring to FIG. 3, the first pixel group PG2 includes a first pixel PX1, a second pixel PX2, and a third pixel PX3.

The first pixel PX1 includes a first sub-pixel region SR1, a second sub-pixel region SR2, and a second sub-region DR1 disposed between the first and second sub-pixel regions SR1 and SR2. The second sub-region DR1 has a horizontal width W3 greater than a horizontal width W1 of the first and second sub-pixel regions SR1 and SR2. Accordingly, the second sub-region DR1 of the first pixel PX1 is more outwardly protruded than the first and second sub-pixel regions SR1 and SR2 of the first pixel PX1 when viewed in a plan view. In particular, the first pixel PX1 protrudes in the first direction D1, such that in the view of FIG. 3, the right side of the by the second sub-region DR1 is not flush with the right side of the first sub-region PR1.

The first pixel PX2 includes a third sub-pixel region SR3, a fourth sub-pixel region SR4, and a fourth sub-region DR2 disposed between the third and fourth sub-pixel regions SR3 and SR4. The fourth sub-region DR2 has a horizontal width W4 greater than a horizontal width W1 of the third and fourth sub-pixel regions SR3 and SR4. Therefore, the fourth sub-region DR2 of the second pixel PX2 protrudes in the horizontal direction to the right, while being recessed in the horizontal direction on the left side in a plan view. In particular, the second pixel PX2 has a shape in which the fourth sub-region DR2 is shifted along the first direction D1 such that the midpoint of the width W4 is not aligned with the midpoint of the width W1.

Here, the second sub-region DR1 of the first pixel PX1 and the fourth sub-region DR2 of the second pixel PX2 protrude in the same direction. To accommodate the protrusion of the second sub-region DR1, the side of the fourth sub-region DR2 that is closest to the first pixel PX1 is recessed in plan view.

A width W8 of the protruding portion of the fourth sub-region DR2 is about two times greater than a width W7 of the protruding portion of the second sub-region DR1. Therefore, although the left side portion of the second pixel PX2 is recessed, the horizontal width W4 of the fourth sub-region DR2 is substantially the same as the horizontal width W3 of the second sub-region DR1.

The third pixel PX3 includes a fifth sub-pixel region SR5, a sixth sub-pixel region SR6, and a sixth sub-region DR3 disposed between the fifth and sixth sub-pixel regions SR5 and SR6. Since the sixth sub-region DR3 has the horizontal width W5 smaller than the horizontal width W2 of the fifth and sixth sub-pixel regions SR5 and SR6, the sixth sub-region DR3 of the third pixel PX3 has a recessed portion that is absent in the fifth and sixth sub-pixel regions SR5 and SR6 in plan view. In particular, the recess is formed on the side of the sixth sub-region DR3 that is closest to the fourth sub-region DR2. Hence, the recess in the third pixel PX3 accommodates the fourth sub-region DR2 of the second pixel PX2.

Accordingly, the second sub-region DR1 extends toward the second pixel PX2 adjacent thereto and is accommodated by the recess of the second pixel PX2, and the fourth sub-region DR2 extends toward the third pixel PX3 and is accommodated in the recess of the third pixel PX3. As described above, the driving areas are disposed to allow the adjacent pixels to share the spaces thereof.

Therefore, the vertical length of the second and fourth sub-regions DR1 and DR2 may be prevented from increasing. As a result, the aperture ratio of the first and second pixels PX1 and PX2 having the relatively small pixel width may be improved, and the transmittance of the display apparatus may be improved.

Figure 4:
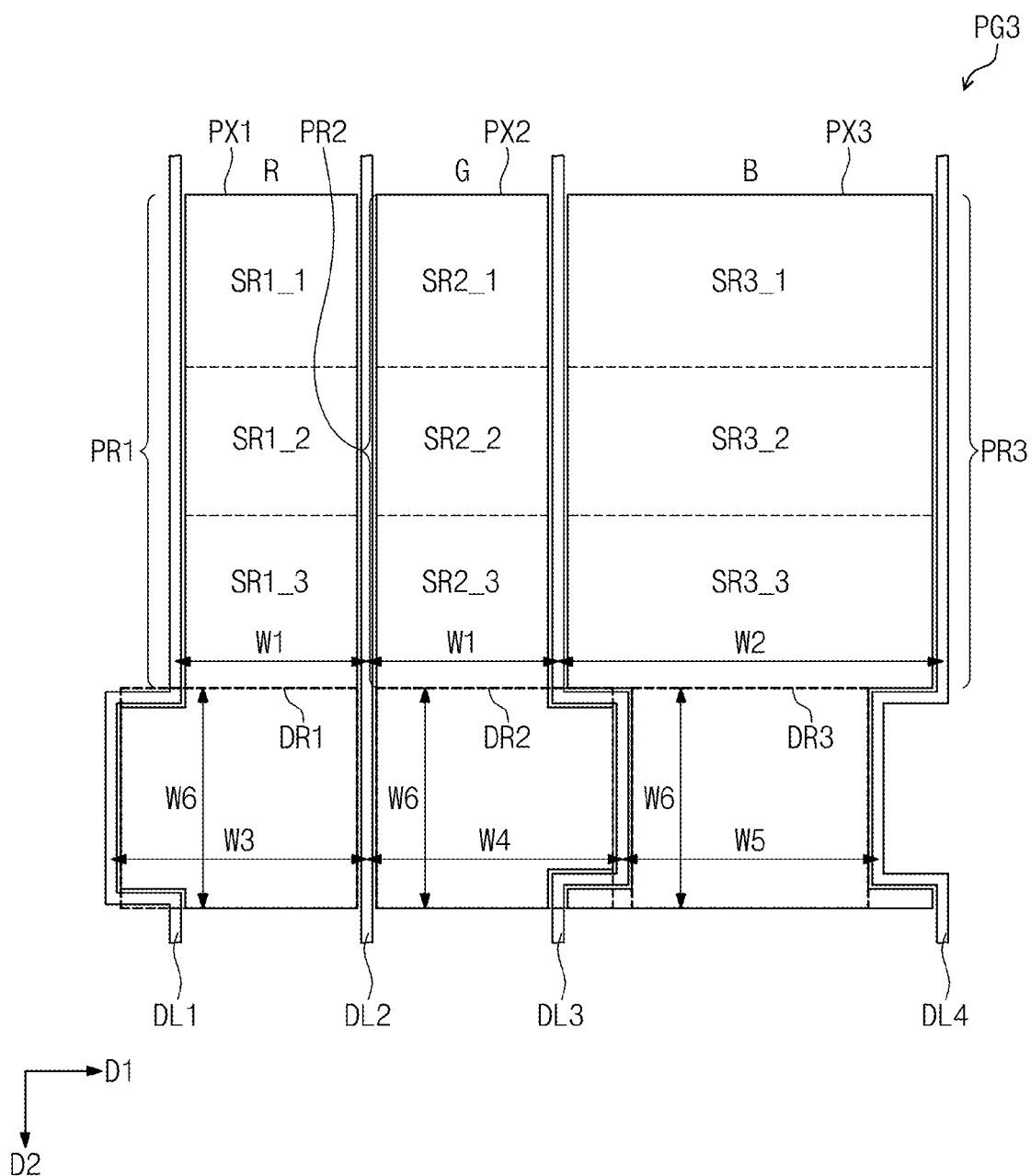
FIG. 4 is a plan view showing a first pixel group of a display panel according to another exemplary embodiment of the present disclosure.

FIG. 4 is a plan view showing a first pixel group of a display panel according to another exemplary embodiment of the present disclosure. In the present exemplary embodiment, the pixel groups PG have the same structure and function, and thus FIG. 3 shows only a first pixel group PG3 among the pixel groups PG as a representative example and details of others will be omitted.

Referring to FIG. 4, the first pixel group PG3 includes a first pixel PX1, a second pixel PX2, and a third pixel PX3.

The first pixel PX1 includes a first sub-region PR1 and a second sub-region DR1, and the first sub-region PR1 includes first, second, and third sub-pixel regions SR1_1, SR1_2, and SR1_3. The first, second, and third sub-pixel regions SR1_1, SR1_2, and SR1_3 are sequentially arranged in the second direction D2 and the second sub-region DR1 is disposed adjacent to the third sub-pixel region SR1_3 in the column direction D2. The first, second, and third sub-pixel regions SR1_1, SR1_2, and SR1_3 have the same horizontal width W1 and the second sub-region DR1 has a horizontal width W3 greater than a horizontal width W1 of the first, second, and third sub-pixel regions SR1_1, SR1_2, and SR1_3. Accordingly, the second sub-region DR1 of the first pixel PX1 protrudes from a line that would be flush with the sides of the first, second, and third sub-pixel regions SR1_1, SR1_2, and SR1_3 in plan view. In reference to FIG. 4, the second sub-region DR1 protrudes from a left side portion of the first pixel PX1.

The second pixel PX2 includes a third sub-region PR2 and a fourth sub-region DR2, and the third sub-region PR2 includes fourth, fifth, and sixth sub-pixel regions SR2_1, SR2_2, and SR2_3. The fourth, fifth, and sixth sub-pixel regions SR2_1, SR2_2, and SR2_3 are sequentially arranged in the column direction D2 and the fourth sub-region DR2 is disposed adjacent to the sixth sub-pixel region SR2_3 in the column direction D2. The fourth sub-region DR2 has a horizontal width W4 greater than the horizontal width W1 of the fourth, fifth, and sixth sub-pixel regions SR2_1, SR2_2, and SR2_3. Therefore, the fourth sub-region DR2 of the second pixel PX2 protrude from a line that would be flush with the fourth, fifth, and sixth sub-pixel regions SR2_1, SR2_2, and SR2_3 in plan view. In reference to FIG. 4, the fourth sub-region DR2 protrudes from a right side portion of the second pixel PX2.

The third pixel PX3 includes a fifth sub-region PR3 and a sixth sub-region DR3, and the fifth sub-region PR3 includes seventh, eighth, and ninth sub-pixel regions SR3_1, SR3_2, and SR3_3. The seventh, eighth, and ninth sub-pixel regions SR3_1, SR3_2, and SR3_3 are sequentially arranged in the column direction D2 and the sixth sub-region DR3 is disposed adjacent to the ninth sub-pixel region SR3_3 in the column direction D2.

Since the sixth sub-region DR3 has a horizontal width W4 smaller than a horizontal width W2 of the seventh, eighth, and ninth sub-pixel regions SR3_1, SR3_2, and SR3_3, the sixth sub-region DR3 of the third pixel PX3 is more inwardly recessed to the inside of the third pixel PX3 than the seventh, eighth, and ninth sub-pixel regions SR3_1, SR3_2, and SR3_3. In particular, left and right side portions of the third pixel PX3 are recessed. The fourth sub-region DR2 of the second pixel PX2 and a second sub-region DR1 of a first pixel PX1 of a next pixel group are respectively accommodated in the left and right recessed side portions of the third pixel PX3. Thus, the second and fourth sub-regions DR1 and DR2 are disposed in available spaces of the adjacent pixel, e.g., the third pixel PX3. As described above, the sub-regions are disposed to allow the pixels adjacent to each other to share the spaces.

Accordingly, the vertical length of the second and fourth sub-regions DR1 and DR2 do not increasing. As a result, the aperture ratio of the first and second pixels PX1 and PX2 having the relatively small pixel width may be improved, along with the transmittance of the display apparatus.

Figure 5:
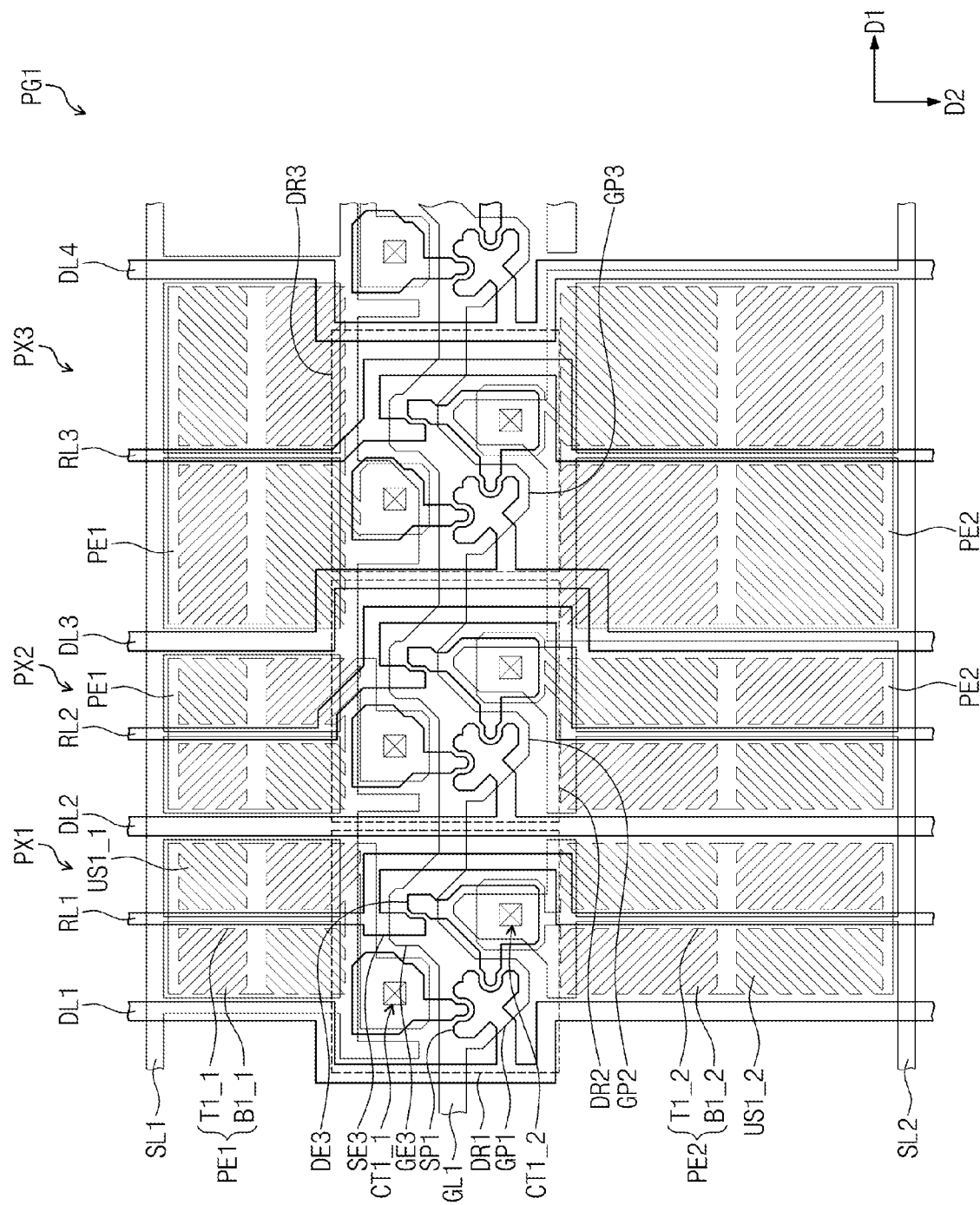
FIG. 5 is a layout diagram showing a first pixel group according to an exemplary embodiment of the present disclosure.
Figure 6:
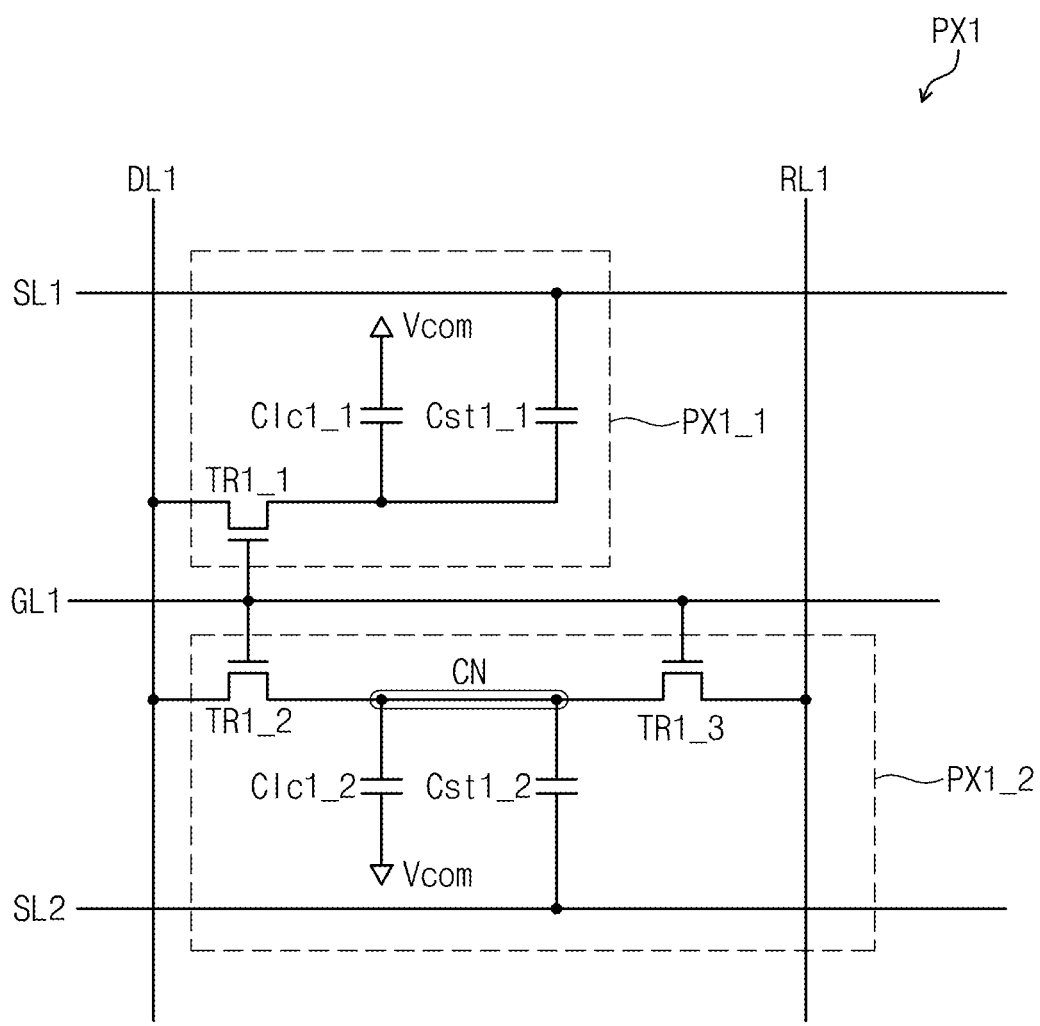
FIG. 6 is an equivalent circuit diagram showing a first pixel shown in FIG. 5.

FIG. 5 is a layout diagram showing the first pixel group PG1 shown in FIG. 2 and FIG. 6 is an equivalent circuit diagram showing the first pixel PX1 shown in FIG. 5.

Referring to FIG. 5, the first pixel group PG1 includes the first to third pixels PX1 to PX3 arranged in the row direction Dl. Each of the first to third pixels PX1 to PX3 has a resistance division structure to apply different pixel voltages to two sub-pixel electrodes using a resistance division resistor, e.g., a third transistor.

The display panel further includes a first gate line GL1 connected to the first pixel group PG1 and first, second, and third data lines DL1, DL2, and DL3. The first gate line GL1 extends in the row direction D1 and the first, second, and third data lines DL1, DL2, and DL3 extend in the column direction D2.

The first pixel PX1 includes a first sub-pixel electrode PE1 disposed in the first sub-pixel region SR1 (refer to FIG. 1) and a second sub-pixel electrode PE2 disposed in the second sub-pixel region SR2 (refer to FIG. 1). Devices used to drive the first and second sub-pixel electrodes PE1 and PE2 of the first pixel PX1 are disposed in the second sub-region DR1 of the first pixel PX1.

The second pixel PX2 includes a first sub-pixel electrode PE1 disposed in the third sub-pixel region SR3 (refer to FIG. 1) and a second sub-pixel electrode PE2 disposed in the fourth sub-pixel region SR4 (refer to FIG. 1). Devices used to drive the first and second sub-pixel electrodes PE1 and PE2 of the second pixel PX2 are disposed in the fourth sub-region DR2 of the second pixel PX2.

The third pixel PX3 includes a first sub-pixel electrode PE1 disposed in the fifth sub-pixel region SR5 (refer to FIG. 1) and a second sub-pixel electrode PE2 disposed in the sixth sub-pixel region SR6 (refer to FIG. 1). Devices used to drive the first and second sub-pixel electrodes PE1 and PE2 of the third pixel PX3 are disposed in the sixth sub-region DR3 of the third pixel PX3.

The second, fourth, and sixth sub-regions DR1, DR2, and DR3 are arranged in the row direction D1 and overlapped with the first gate line GL1. The first, second, and third pixels PX1, PX2, and PX3 are commonly connected to the first gate line GL1 and respectively connected to the first, second, and third data lines DL1, DL2, and DL3.

FIG. 6 shows the equivalent circuit diagram of the first pixel PX1. In the present exemplary embodiment, the second and third pixels PX2 and PX3 have substantially the same equivalent circuit diagram as that of the first pixel PX1, and thus the equivalent circuit diagram of the second and third pixels PX2 and PX3 are not shown.

Referring to FIG. 6, the first pixel PX1 includes a first sub-pixel PX1_1 and a second sub-pixel PX1_2.

The first sub-pixel PX1_1 includes a first transistor TR1_1, a first liquid crystal capacitor Clc1_1, and a first storage capacitor Cst1_1. The second sub-pixel PX1_2 includes a second transistor TR1_2, a third transistor TR1_3, a second liquid crystal capacitor Clc1_2, and a second storage capacitor Cst1_2.

The first transistor TR1_1 includes a first gate electrode connected to the first gate line GL1, a first source electrode connected to the first data line DL1, and a first drain electrode connected to the first liquid crystal capacitor Clc1_1 and the first storage capacitor Cst1_1.

The first liquid crystal capacitor Clc1_1 includes a first electrode connected to the first drain electrode of the first transistor TR1_1 and a second electrode applied with the common voltage Vcom. The first storage capacitor Cst1_1 includes a first electrode connected to the first drain electrode of the first transistor TR1_1 and a second electrode connected to a first storage line SL1 to receive a storage voltage Vcst.

The second transistor TR1_2 includes a second gate electrode connected to the first gate line GL1, a second source electrode connected to the first data line DL1, and a second drain electrode connected to the second liquid crystal capacitor Clc1_2 and the second storage capacitor Cst1_2.

The second liquid crystal capacitor Clc1_2 includes a first electrode connected to the second drain electrode of the second transistor TR1_2 and a second electrode applied with the common voltage Vcom. The second storage capacitor Cst1_2 includes a first electrode connected to the second drain electrode of the second transistor TR1_2 and a second electrode connected to a second storage line SL2 to receive the storage voltage Vcst.

The third transistor TR1_3 includes a third gate electrode connected to the first gate line GL1, a third source electrode connected to a first voltage line RL1 to receive the storage voltage Vcst, and a third drain electrode electrically connected to the second drain electrode of the second transistor TR1_2.

The first to third transistors TR1_1 to TR1_3 are turned on in response to the gate signal applied thereto through the first gate line GL1. The data voltage provided through the first data line DL1 is applied to the first electrode of the first liquid crystal capacitor Clc1_1 through the turned-on first transistor TR1_1. The first liquid crystal capacitor Clc1_1 is charged with a first pixel voltage corresponding to a difference in level between the data voltage and the common voltage Vcom. The data voltage is applied to the first electrode of the second liquid crystal capacitor Clc1_2 through the turned-on second transistor TR1_2. The data voltage has a positive polarity or a negative polarity.

The common voltage Vcom may have substantially the same voltage as that of the storage voltage Vcst. The storage voltage Vcst provided through the first voltage line RL1 is applied to the first electrode of the second liquid crystal capacitor Clc1_2 through the turned-on third transistor TR1_3. A voltage (hereinafter, referred to as a divided voltage) at a contact node CN at which the second drain electrode of the second transistor TR1_2 and the third drain electrode of the third transistor TR1_3 are connected corresponds to a divided voltage, as the second and third transistors TR1_2 and TR1_3 act as resistors of a voltage divider when they are turned on. That is, the divided voltage has a value between the data voltage provided through the turned-on second transistor TR1_2 and the storage voltage Vcst provided through the turned-on third transistor TR1_3. Accordingly, the second liquid crystal capacitor Clc1_2 is charged with a second pixel voltage corresponding to a difference in level between the divided voltage and the common voltage Vcom.

The first pixel voltage charged in the first liquid crystal capacitor Clc1_1 has a level different from that of the second pixel voltage charged in the second liquid crystal capacitor Clc1_2, and thus the first sub-pixel PX1_1 displays an image with a grayscale level different from that of an image displayed by the second sub-pixel PX1_2.

As described above, since the first and second sub-pixels PX1_1 and PX1_2 display images with different grayscale levels, a visibility of the first pixel PX1 may be improved. The second and third pixels PX2 and PX3 have substantially the same equivalent circuit diagram as that of the first pixel PX1 to improve the visibility thereof. Therefore, details of the equivalent circuit diagram of the second and third pixels PX2 and PX3 will be omitted.

Hereinafter, the layout of the first to third pixels PX1 to PX3 will be described in detail with reference to FIG. 5 again.

The first gate line GL1 extends in the row direction D1 through the second, fourth, and sixth sub-regions DR1, DR2, and DR3. A first gate electrode part GP1 extending from the first gate line GL1 is disposed in the second sub-region DR1, a second gate electrode part GP2 extending from the first gate line GL1 is disposed in the fourth sub-region DR2, and a third gate electrode part GP3 extending from the first gate line GL1 is disposed in the sixth sub-region DR3.

The first gate electrode part GP1 is used as the first and second gate electrodes of the first and second transistors TR1_1 and TR1_2 of the first pixel PX1. The third gate electrode GE3 of the third transistor TR1_3 of the first pixel PX1 is branched from the first gate line GL1, disposed in the second sub-region DR1, and spaced apart from the first gate electrode part GP1.

The first data line DL1 is disposed adjacent to the second sub-region DR1 and extends in the column direction D2. A first source electrode part SP1 branched from the first data line DL1 is disposed in the second sub-region DR1. The first source electrode part SP1 is used as the first and second source electrodes of the first and second transistors TR1_1 and TR1_2 of the first pixel PX1. The first source electrode part SP1 is disposed on the first gate electrode part GP1. The first drain electrode of the first transistor TR1_1 is disposed on the first gate electrode part GP1 and spaced apart from the first source electrode part SP1, and the second drain electrode of the second transistor TR1_2 is disposed on the first gate electrode part GP1 and spaced apart from the first source electrode part SP1. The first drain electrode of the first transistor TR1_1 and the second drain electrode of the second transistor TR1_2 are electrically insulated from each other when the first and second transistors TR1_1 and TR1_2 are turned off.

The first sub-pixel electrode PE1_1 serves as the first electrode of the first liquid crystal capacitor Clc1_1 and is electrically connected to the first drain electrode of the first transistor TR1_1 through a first contact part CT1. The second sub-pixel electrode PE1_2 serves as the first electrode of the second liquid crystal capacitor Clc1_2 and is electrically connected to the second drain electrode of the second transistor TR2 through a second contact part CT2.

The first and second contact parts CT1 and CT2 are disposed in the second sub-region DR1.

The third source electrode SE3 and the third drain electrode DE3 of the third transistor TR1_3 are disposed on the third gate electrode GE3 of the third transistor TR1_3. The third drain electrode DE3 of the third transistor TR1_3 extends from the second drain electrode of the second transistor TR1_2. The third source electrode SE3 of the third transistor TR1_3 is branched from the first voltage line RL1 and disposed on the third gate electrode GE3 to be spaced apart from the third drain electrode DE3 of the third transistor TR1_3.

The first sub-pixel electrode PE1_1 includes a first trunk portion T1_1 and a plurality of first branch portions B1_1 extending from the first trunk portion T1_1 in a radial form to divide the first sub-pixel region SR1 into a plurality of domains. The first trunk portion T1_1 has a cross shape, and in this case, the first sub-pixel region SR1 is divided into four domains by the first trunk portion T1_1. The first branch portions B1_1 extend substantially in parallel to each other in each domain defined by the first trunk portion T1_1 and are spaced apart from each other.

As an example, the first branch portions B1_1 extend in a direction forming an angle of about 45 degrees with respect to the first trunk portion T1_1. The first branch portions B1_1 adjacent to each other are spaced apart from each other by a unit of micrometer to form a plurality of first micro-slits US1_1. Liquid crystal molecules of the liquid crystal layer are pretilted in different direction in each domain by the first micro-slits US1_1.

The second sub-pixel electrode PE1_2 includes a second trunk portion T1_2 and a plurality of second branch portions B1_2 extending from the second trunk portion T1_2 in a radial form to divide the second sub-pixel region SR2 into a plurality of domains. The second trunk portion T1_2 has a cross shape, and in this case, the second sub-pixel region SR2 is divided into a plurality of domains by the second trunk portion T1_2. The second branch portions B1_2 extend substantially in parallel to each other in each domain defined by the second trunk portion T1_2 and are spaced apart from each other. The second branch portions B1_2 adjacent to each other are spaced apart from each other by a unit of micrometer to form a plurality of second micro-slits US1_2. The liquid crystal molecules of the liquid crystal layer are pretilted in different directions in each domain by the second micro-slits US1_2.

The first storage line SL1 is overlapped with the first sub-pixel electrode PE1_1 to form the first storage capacitor Cst1_1 and the second storage line SL2 is overlapped with the second sub-pixel electrode PE1_2 to form the second storage capacitor Cst1_2.

The first voltage line RL1 extends in the column direction D2. The first voltage line RL1 is disposed at a position to overlap with the first trunk portion T1_1 in the first sub-pixel region SR1 and disposed at a position to overlap with the second trunk portion T1_2 in the second sub-pixel region SR2.

The fourth and sixth sub-regions DR2 and DR3 of the second and third pixels PX2 and PX3 have substantially the same structure as that of the second sub-region DR1 of the first pixel PX1, and thus details thereof will be omitted.

Figure 7:
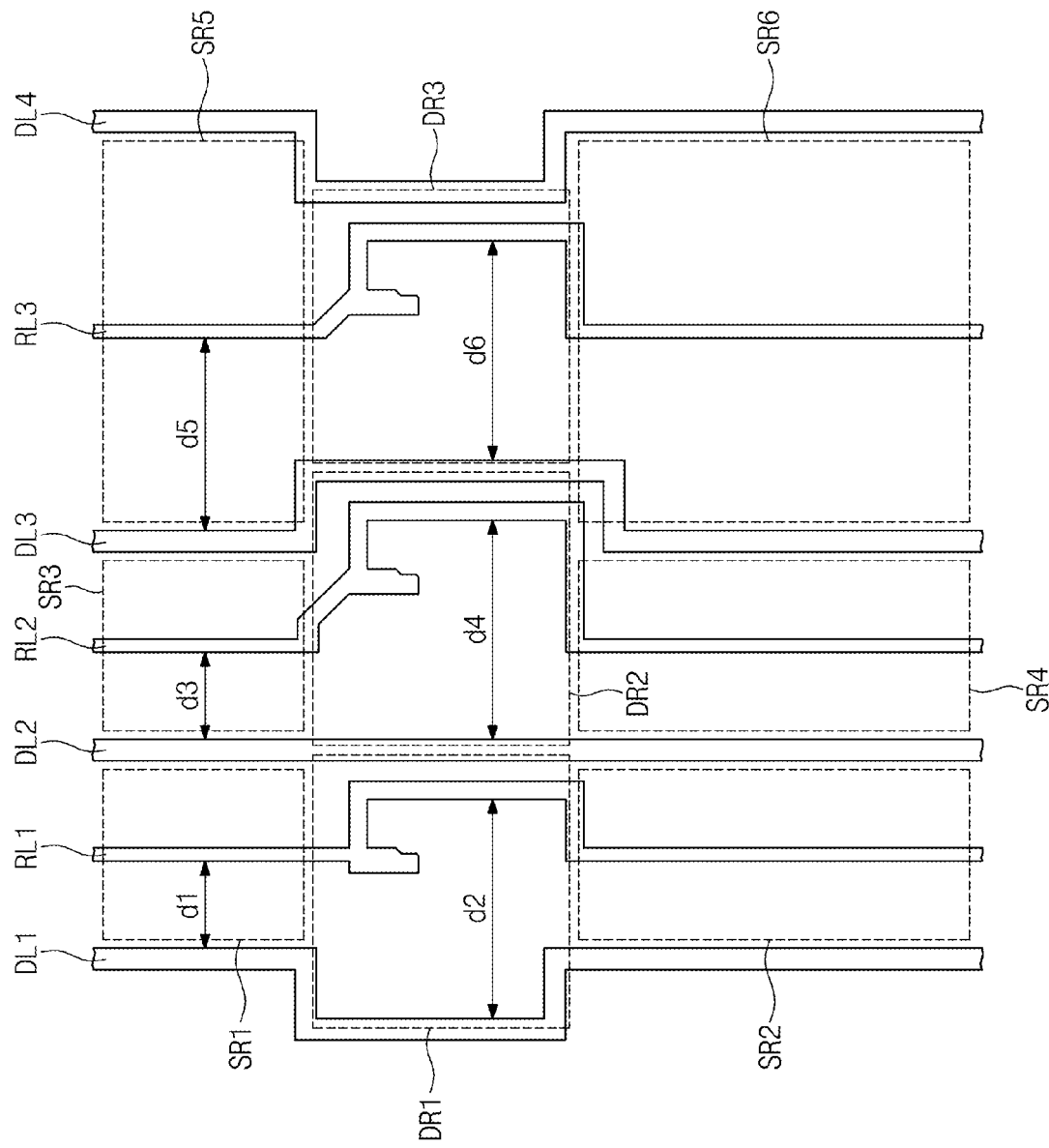
FIG. 7 is a plan view showing first to third data lines and first to third voltage lines shown in FIG. 5.

FIG. 7 is a plan view showing the first to third data lines and first to third voltage lines shown in FIG. 5. For the convenience of explanation, the source electrode parts branched from the first to third data lines are omitted in FIG. 7.

Referring to FIG. 7, first to fourth data lines DL1 to DL4 are arranged in the column direction D1 and spaced apart from each other. The first to third voltage lines RL1 to RL3 extend in the column direction D2 and are arranged in the row direction D1 to be spaced apart from each other. The first voltage line RL1 is disposed between the first and second data lines DL1 and DL2, the second voltage line RL2 is disposed between the second and third data lines DL2 and DL3, and the third voltage line RL3 is disposed between the third and fourth data lines DL3 and DL4.

As an example, the second data line DL2 extends in the column direction D2 and has a stripe shape, the first data line DL1 is bent toward a left direction with respect to the second data line DL2, and the third data line DL3 is bent toward a right direction with respect to the second data line DL2. In particular, the first data line DL1 is bent at a position adjacent to the second sub-region DR1 to increase the width of the second sub-region DR1. In detail, a distance between the first and second data lines DL1 and DL2 in the first sub-region DR1 is greater than a distance between the first and second data lines DL1 and DL2 in the first and second sub-pixel regions SR1 and SR2. Similarly, the third data line DL3 is bent at a position adjacent to the fourth sub-region DR2 to increase the width of the fourth sub-region DR2. In detail, a distance between the second and third data lines DL2 and DL3 in the fourth sub-region DR2 is greater than a distance between the second and third data lines DL2 and DL3 in the third and fourth sub-pixel regions SR3 and SR4.

The first voltage line RL1 is disposed at a position in the first and second sub-pixel regions SR1 and SR2, which corresponds to a half of the distance between the first and second data lines DL1 and DL2. The first voltage line RL1 is bent to one side in the second sub-region DR1 and disposed adjacent to one of the first and second data lines DL1 and DL2. As an example, the first voltage line RL1 is bent adjacent to the second data line DL2 and the first data line DL1 is bent to a direction opposite to the direction in which the first voltage line RL1 is bent. Accordingly, a first distance d1 between the first data line DL1 and the first voltage line RL1 in the first and second sub-pixel regions SR1 and SR2 is smaller than a second distance d2 between the first data line DL1 and the first voltage line RL1 in the second sub-region DR1.

The first to third transistors TR1 to TR3 of the first pixel PX1 is disposed between the first data line DL1 and the first voltage line RL1 in the second sub-region DR1.

The second voltage line RL2 is disposed approximately halfway between the second and third data lines DL2 and DL3 in the third and fourth sub-pixel regions SR3 and SR4. The second voltage line RL2 is bent to one side in the fourth sub-region DR2 and disposed adjacent to one of the second and third data lines DL2 and DL3. As an example, the second voltage line RL2 bends such that it becomes closer to the third data line DL3 as it moves away from the third sub-pixel region SR3. The second data line DL2 extends in the column direction D2 substantially straight. Therefore, a third distance d3 between the second data line DL2 and the second voltage line RL2 in the third and fourth sub-pixel regions SR3 and SR4 is smaller than a fourth distance d4 between the second data line DL2 and the second voltage line RL2 in the fourth sub-region DR2.

The first to third transistors TR1 to TR3 of the second pixel PX2 is disposed between the second data line DL2 and the second voltage line RL2 in the fourth sub-region DR2.

The third voltage line RL3 is disposed at a position in the fifth and sixth sub-pixel regions SR5 and SR6, which corresponds to half of the distance between the third and fourth data lines DL3 and DL4. The third voltage line RL3 is bent to one side in the sixth sub-region DR3 and disposed adjacent to one of the third and fourth data lines DL3 and DL4. As an example, the third voltage line RL3 is bent in the same direction as the third voltage line RL3, and the fourth data line DL4 is bent to an opposite direction to the third voltage line RL3. Thus, a fifth distance d5 between the third data line DL3 and the third voltage line RL3 in the fifth and sixth sub-pixel regions SR5 and SR6 is smaller than a sixth distance d6 between the third data line DL3 and the third voltage line RL3 in the sixth sub-region DR3.

The first to third transistors TR1 to TR3 of the third pixel PX3 is disposed between the third data line DL3 and the third voltage line RL3 in the sixth sub-region DR3.

As an example, the first and third distances d1 and d3 are substantially the same with each other and the fifth distance d5 is about two times greater than the first and third distances d1 and d3. The second, fourth, and sixth distances d2, d4, and d6 are substantially the same with each other.

Figure 8:
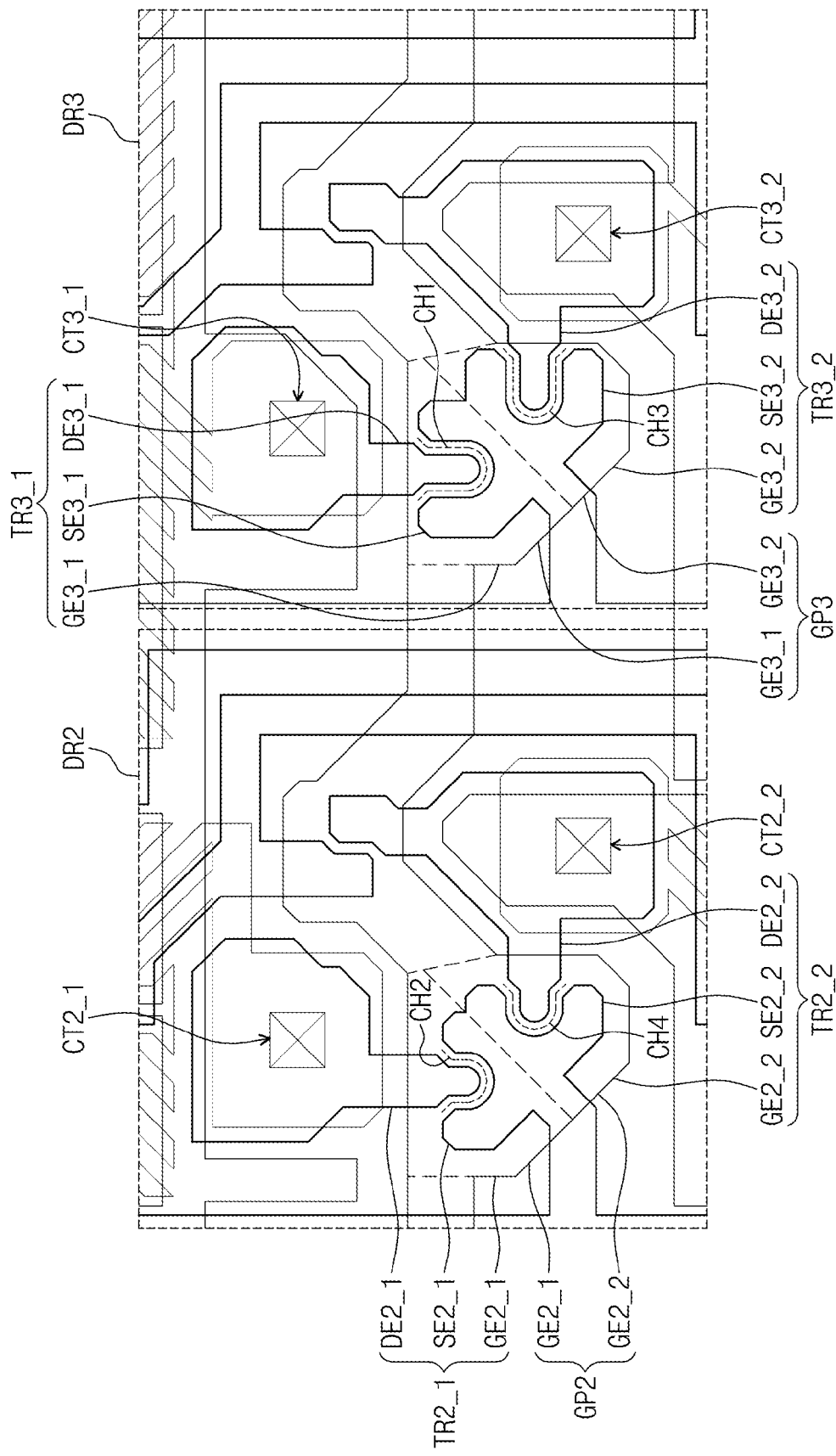
FIG. 8 is an enlarged plan view showing a second sub-region of a first pixel and a sixth sub-region of a third pixel, which are shown in FIG. 5.

FIG. 8 is an enlarged plan view showing the second sub-region of the first pixel and the sixth sub-region of the third pixel, which are shown in FIG. 5.

Referring to FIG. 8, the second gate electrode part GP2 extending from the first gate line GL1 and a third transistor TR2_3 are disposed in the fourth sub-region DR2. The third gate electrode part GP3 extending from the first gate line GL1 and a third gate electrode GE3_3 of a third transistor TR3_3 are disposed in the sixth sub-region DR3.

The second gate electrode part GP2 includes first and second gate electrodes GE2_1 and GE2_2 of first and second transistors TR2_1 and TR2_2 of the second pixel PX2. The third gate electrode part GP3 includes first and second gate electrodes GE3_1 and GE3_2 of first and second transistors TR3_1 and TR3_2 of the third pixel PX3.

A second source electrode part SP2 branched from the second data line DL2 is disposed in the fourth sub-region DR2. The second source electrode part SP2 is disposed on the second gate electrode part GP2. The second source electrode part SP2 includes a first source electrode SE2_1 of the first transistor TR2_1 of the second pixel PX2 and a second source electrode SE2_2 of the second transistor TR2_2 of the second pixel PX2. A first drain electrode DE2_1 of the first transistor TR2_1 is disposed on the second gate electrode part GP2 and spaced apart from the first source electrode SE2_1, and a second drain electrode DE2_2 of the second transistor TR2_2 is disposed on the second gate electrode part GP2 and spaced apart from the second source electrode SE2_2.

A third source electrode part SP3 branched from the third data line DL3 is disposed in the sixth sub-region DR3. The third source electrode part SP3 is disposed on the third gate electrode part GP3. The third source electrode part SP3 includes a first source electrode SE3_1 of the first transistor TR3_1 of the third pixel PX3 and a second source electrode SE3_2 of the second transistor TR3_2 of the third pixel PX3. A first drain electrode DE3_1 of the first transistor TR3_1 is disposed on the third gate electrode part GP3 and spaced apart from the first source electrode SE3_1, and a second drain electrode DE3_2 of the second transistor TR3_2 is disposed on the third gate electrode part GP3 and spaced apart from the second source electrode SE3_2.

Here, the first transistor TR3_1 of the third pixel PX3 has a size different from that of the first transistor TR2_1 of the second pixel PX2. In detail, the first transistor TR3_1 of the third pixel PX3 has a channel length CH1 greater than a channel length CH2 of the first transistor TR2_1 of the second pixel PX2. Similarly, the second transistor TR3_2 of the third pixel PX3 has a size different from that of the second transistor TR2_2 of the second pixel PX2. In detail, the second transistor TR3_2 of the third pixel PX3 has a channel length CH3 greater than a channel length CH4 of the second transistor TR2_2 of the second pixel PX2.

As shown in FIG. 5, since the fifth and sixth sub-pixel electrodes PE3_1 and PE3_2 have the size greater than that of the third and fourth sub-pixel electrodes PE2_1 and PE2_2, a kickback voltage (ΔVk) of the second pixel PX2 is different from that of the third pixel PX3.

As represented by the following Equation, the kickback voltage (ΔVk) is inversely proportional to the size of the liquid crystal capacitor. Accordingly, when the sub-pixel electrodes of the pixels have different sizes, a difference in kickback voltage (ΔVk) occurs between the pixels.

$$\Delta Vk = \frac{Cgd}{Clc + Cst + Cgd} \times \Delta Vg \qquad \text{Equation}$$

In the Equation, Clc denotes a capacitance of the liquid crystal capacitor, Cst denotes a capacitance of the storage capacitor, Cgd denotes a parasitic capacitance between the gate electrode and the drain electrode or the sub-pixel electrode, and ΔVg denotes a difference value between the gate-on voltage and the gate-off voltage, which are applied to the gate electrode.

As represented by the Equation, since the kickback voltage ΔVk is affected by the parasitic capacitance of each transistor disposed in the pixel, the difference of the kickback voltage, which is caused by the difference in size between the sub-pixel electrodes, may be compensated by adjusting the size of each transistor disposed in the pixel.

Therefore, when the size of each of the first and second transistors TR2_1 and TR2_2 of the second pixel PX2 is different from the size of each of the first and second transistors TR3_1 and TR3_2 of the third pixel PX3, the difference in kickback voltage ΔVk between the second and third pixels PX2 and PX3 may be reduced.

Although not shown in figures, the size of the first and second transistors TR1_1 and TR1_2 of the first pixel PX1 may be set to be equal to the size of the first and second transistors TR2_1 and TR2_2 of the second pixel PX2. Thus, the difference in kickback voltage ΔVk between the first, second, and third pixels PX1, PX2, and PX3 may be reduced.

Figure 9:
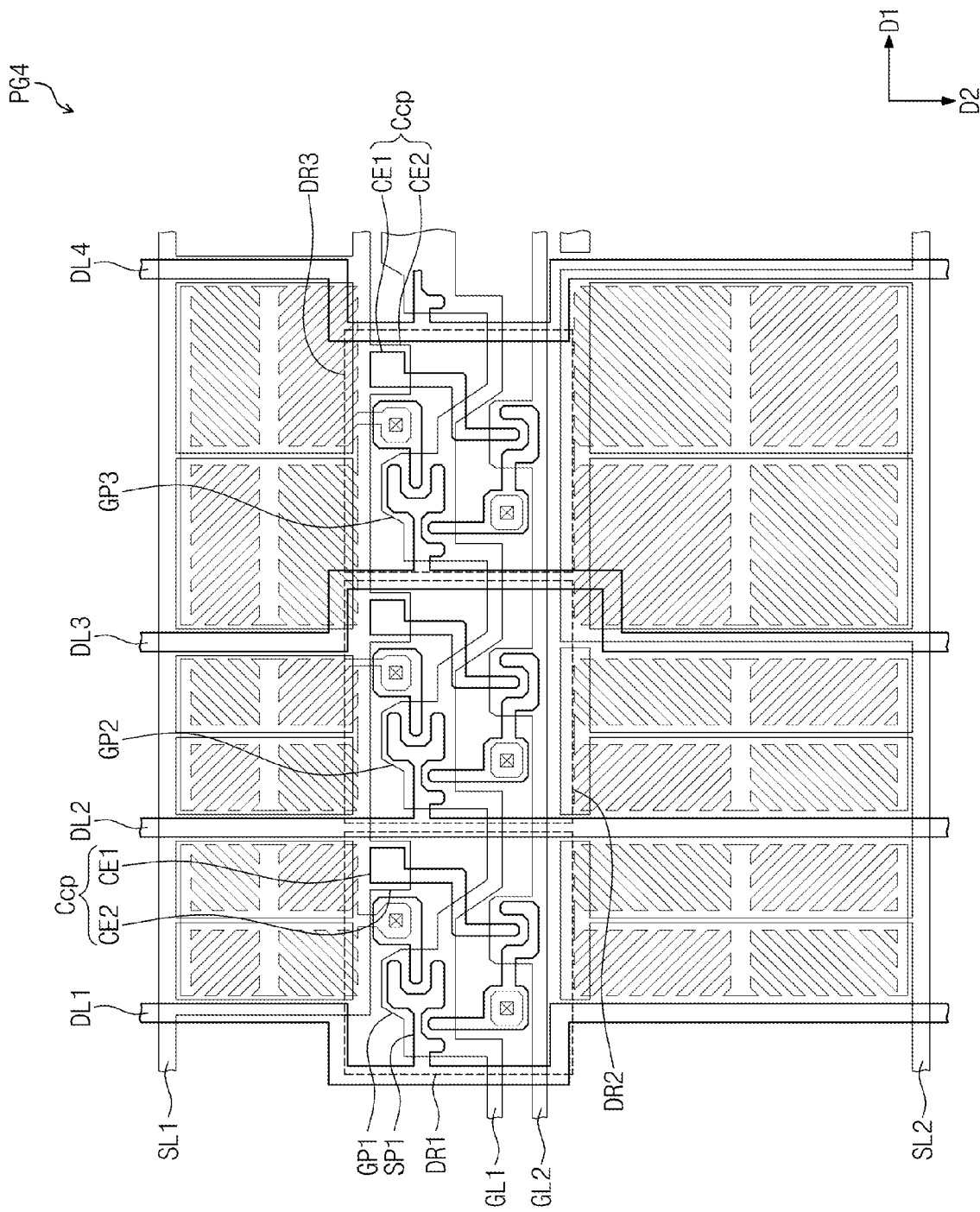
FIG. 9 is a layout diagram showing a first pixel group of a display panel according to another exemplary embodiment of the present disclosure.
Figure 10:
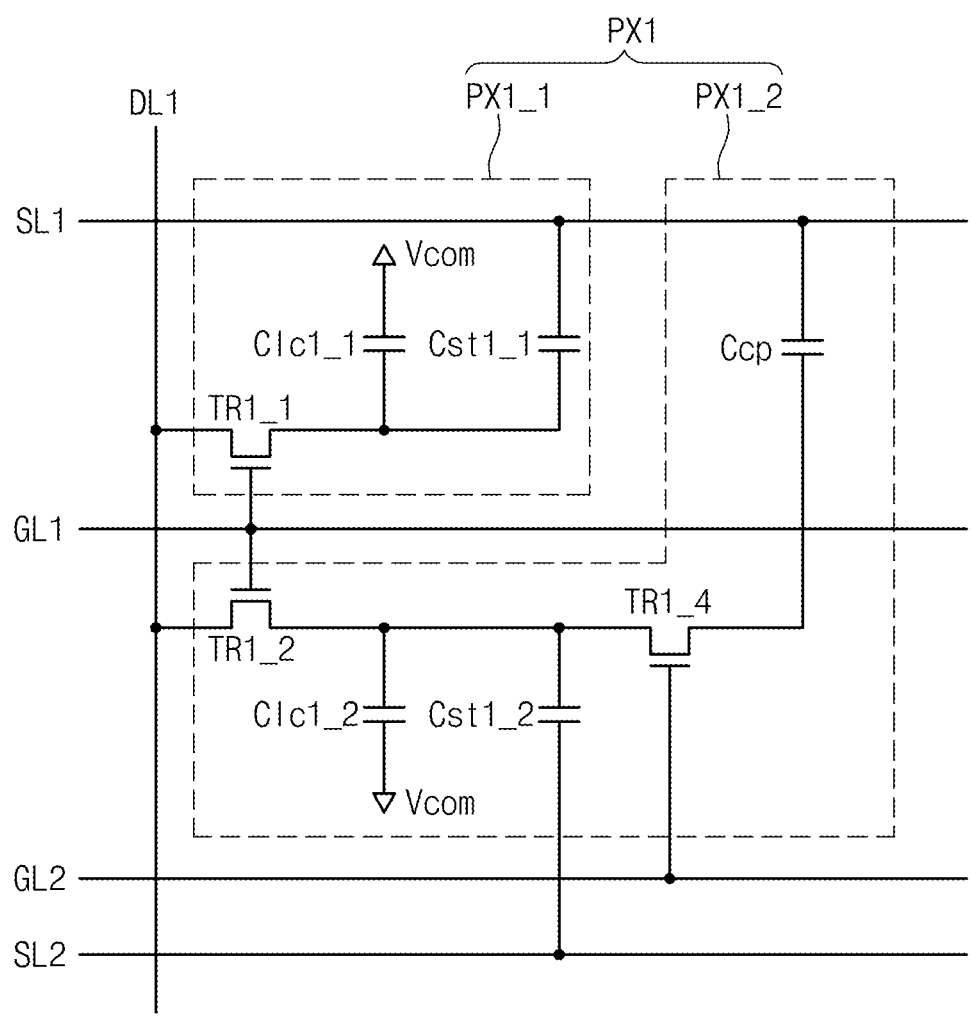
FIG. 10 is an equivalent circuit diagram showing a first pixel shown in FIG. 9.

FIG. 9 is a layout diagram showing a first pixel group of a display panel according to another exemplary embodiment of the present disclosure and FIG. 10 is an equivalent circuit diagram showing a first pixel shown in FIG. 9.

Referring to FIG. 9, a first pixel group PG4 includes first to third pixels PX1 to PX3. Each of the first to third pixels PX1 to PX3 has a structure to apply different pixel voltages to two sub-pixel electrodes using a coupling capacitor.

The display panel further includes first and second gate lines GL1 and GL2 connected to the first pixel group PG4 and first, second, and third data lines DL1, DL2, and DL3. The first and second gate lines GL1 and GL2 extend in the row direction D1 and the first, second, and third data lines DL1, DL2, and DL3 extend in the column direction D2.

The first pixel PX1 includes a first sub-pixel electrode PE1 disposed in the first sub-pixel region SR1 (refer to FIG. 1) and a second sub-pixel electrode PE2 disposed in the second sub-pixel region SR2 (refer to FIG. 1). Devices used to drive the first and second sub-pixel electrodes PE1 and PE2 of the first pixel PX1 are disposed in the second sub-region DR1 of the first pixel PX1.

The second pixel PX2 includes a first sub-pixel electrode PE1 disposed in the third sub-pixel region SR3 (refer to FIG. 1) and a second sub-pixel electrode PE2 disposed in the fourth sub-pixel region SR4 (refer to FIG. 1). Devices used to drive the first and second sub-pixel electrodes PE1 and PE2 of the second pixel PX2 are disposed in the fourth sub-region DR2 of the second pixel PX2.

The third pixel PX3 includes a first sub-pixel electrode PE1 disposed in the fifth sub-pixel region SR5 (refer to FIG. 1) and a second sub-pixel electrode PE2 disposed in the sixth sub-pixel region SR6 (refer to FIG. 1). Devices used to drive the first and second sub-pixel electrodes PE1 and PE2 of the third pixel PX3 are disposed in the sixth sub-region DR3 of the third pixel PX3.

The second, fourth, and sixth sub-regions DR1, DR2, and DR3 are arranged in the row direction D1 and overlap the first and second gate lines GL1 and GL2. The first, second, and third pixels PX1, PX2, and PX3 are commonly connected to the first and second gate lines GL1 and GL2 and respectively connected to the first, second, and third data lines DL1, DL2, and DL3.

FIG. 10 shows the equivalent circuit diagram of the first pixel PX1. In the present exemplary embodiment, the second and third pixels PX2 and PX3 have substantially the same equivalent circuit diagram as that of the first pixel PX1, and in the interest of avoiding redundancy, the equivalent circuit diagram of the second and third pixels PX2 and PX3 are not shown.

Referring to FIG. 10, the first sub-pixel PX1_1 includes a first transistor TR1_1, a first liquid crystal capacitor Clc1_1, and a first storage capacitor Cst1_1. The second sub-pixel PX1_2 includes a second transistor TR1_2, a fourth transistor TR1_4, a second liquid crystal capacitor Clc1_2, a second storage capacitor Cst1_2, and a coupling capacitor Ccp.

The first transistor TR1_1 includes a first gate electrode connected to the first gate line GL1, a first source electrode connected to the first data line DL1, and a first drain electrode connected to the first liquid crystal capacitor Clc1_1 and the first storage capacitor Cst1_1.

The first liquid crystal capacitor Clc1_1 includes a first electrode connected to the first drain electrode of the first transistor TR1_1 and a second electrode applied with the common voltage Vcom. The first storage capacitor Cst1_1 includes a first electrode connected to the first drain electrode of the first transistor TR1_1 and a second electrode applied with the storage voltage Vcst through the first storage line SL1.

The second transistor TR1_2 includes a second gate electrode connected to the first gate line GL1, a second source electrode connected to the first data line DL1, and a second drain electrode connected to the second liquid crystal capacitor Clc1_2 and the second storage capacitor Cst1_2.

The second liquid crystal capacitor Clc1_2 includes a first electrode connected to the second drain electrode of the second transistor TR1_2 and a second electrode applied with the common voltage Vcom. The second storage capacitor Cst1_2 includes a first electrode connected to the second drain electrode of the second transistor TR1_2 and a second electrode applied with the storage voltage Vcst through the second storage line SL2.

The fourth transistor TR1_4 includes a fourth gate electrode connected to the second gate line GL2, a fourth source electrode connected to the coupling capacitor Ccp, and a fourth drain electrode electrically connected to the second drain electrode of the second transistor TR1_2.

The coupling capacitor Ccp includes a first electrode connected to the fourth source electrode of the fourth transistor TR1_4 and a second electrode applied with the storage voltage Vcst through the first storage line SL1.

The first and second transistors TR1_1 and TR1_2 are turned on in response to a first gate signal applied thereto through the first gate line GL1. The data voltage provided through the first data line DL1 is applied to the first electrodes of the first and second liquid crystal capacitors Clc1_1 and Clc1_2 through the turned-on first and second transistors TR1_1 and TR1_2. Accordingly, the first and second liquid crystal capacitors Clc1_1 and Clc1_2 are charged with a first pixel voltage corresponding to a difference in level between the data voltage and the common voltage Vcom.

Then, the fourth transistor TR1_4 is turned on in response to a second gate signal provided through the second gate line GL2. Due to the turned-on fourth transistor TR1_4, a charge sharing occurs between the second liquid crystal capacitor Clc1_2 and the coupling capacitor Ccp.

Consequently, a voltage division occurs between the second liquid crystal capacitor Clc1_2 and the coupling capacitor Ccp after the second gate signal is provided through the second gate line GL2. As a result, the first pixel voltage charged in the second liquid crystal capacitor Clc1_2 is lowered, and the lowering of the first pixel voltage is determined depending on a charge rate of the coupling capacitor Ccp.

Therefore, after the second gate signal is generated, the first liquid crystal capacitor Clc1 is charged with the first pixel voltage and the second liquid crystal capacitor Clc2 is charged with a second pixel voltage lower than the first pixel voltage.

Since the first pixel voltage charged in the first liquid crystal capacitor Clc1_1 has a level different from that of the second pixel voltage charged in the second liquid crystal capacitor Clc1_2, the first sub-pixel PX1_1 displays an image with a grayscale level different from that of an image displayed by the second sub-pixel PX1_2. As described above, since the first and second sub-pixels PX1_1 and PX1_2 display the images with different grayscale levels, a visibility of the first pixel PX1 may be improved.

Hereinafter, the layout of the first to third pixels PX1 to PX3 will be described in detail with reference to FIG. 9 again. In the present exemplary embodiment, the first to sixth sub-pixel regions SR1 to SR6 have substantially the same structure as that of the first to sixth sub-pixel regions SR1 to SR6 shown in FIG. 5, and thus details thereof will be omitted in order to avoid redundancy.

The first and second gate lines GL1 and GL2 extend in the row direction D1 through the second, fourth, and sixth sub-regions DR1, DR2, and DR3. A first gate electrode part GP1 extending from the first gate line GL1 is disposed in the second sub-region DR1, a second gate electrode part GP2 extending from the first gate line GL1 is disposed in the fourth sub-region DR2, and a third gate electrode part GP3 extending from the first gate line GL1 is disposed in the sixth sub-region DR3.

The first gate electrode part GP1 is used as the first and second gate electrodes of the first and second transistors TR1_1 and TR1_2 of the first pixel PX1. The fourth gate electrode GE4 of the fourth transistor TR1_4 of the first pixel PX1 is branched from the second gate line GL2, disposed in the second sub-region DR1, and spaced apart from the first gate electrode part GP1.

The first data line DL1 is disposed adjacent to the second sub-region DR1 and extends in the column direction D2. A first source electrode part SP1 branched from the first data line DL1 is disposed in the second sub-region DR1. The first source electrode part SP1 is used as the first and second source electrodes of the first and second transistors TR1_1 and TR1_2 of the first pixel PX1. The first source electrode part SP1 is disposed on the first gate electrode part GP1. The first drain electrode of the first transistor TR1_1 is disposed on the first gate electrode part GP1 and spaced apart from the first source electrode part SP1, and the second drain electrode of the second transistor TR1_2 is disposed on the first gate electrode part GP1 and spaced apart from the first source electrode part SP1. The first drain electrode of the first transistor TR1_1 and the second drain electrode of the second transistor TR1_2 are electrically insulated from each other when the first and second transistors TR1_1 and TR1_2 are turned off.

The fourth source electrode and the fourth drain electrode of the fourth transistor TR1_4 are disposed on the fourth gate electrode GE4 of the fourth transistor TR1_4. The fourth source electrode of the fourth transistor TR1_4 extends from the second drain electrode of the second transistor TR1_2. The fourth drain electrode of the fourth transistor TR1_4 is connected to the coupling capacitor Ccp.

As an example, the coupling capacitor Ccp includes a first electrode CE1 extending from the fourth drain electrode and a second electrode CE2 extending from the first storage line SL1 to face the first electrode CE1 such that an insulating layer (not shown) is disposed between the first and second electrodes CE1 and CE2.

The structure of the fourth and sixth sub-regions DR2 and DR3 of the second and third pixels PX2 and PX3 is similar to that of the second sub-region DR1 of the first pixel PX1, and thus details thereof will be omitted.

Figure 11:
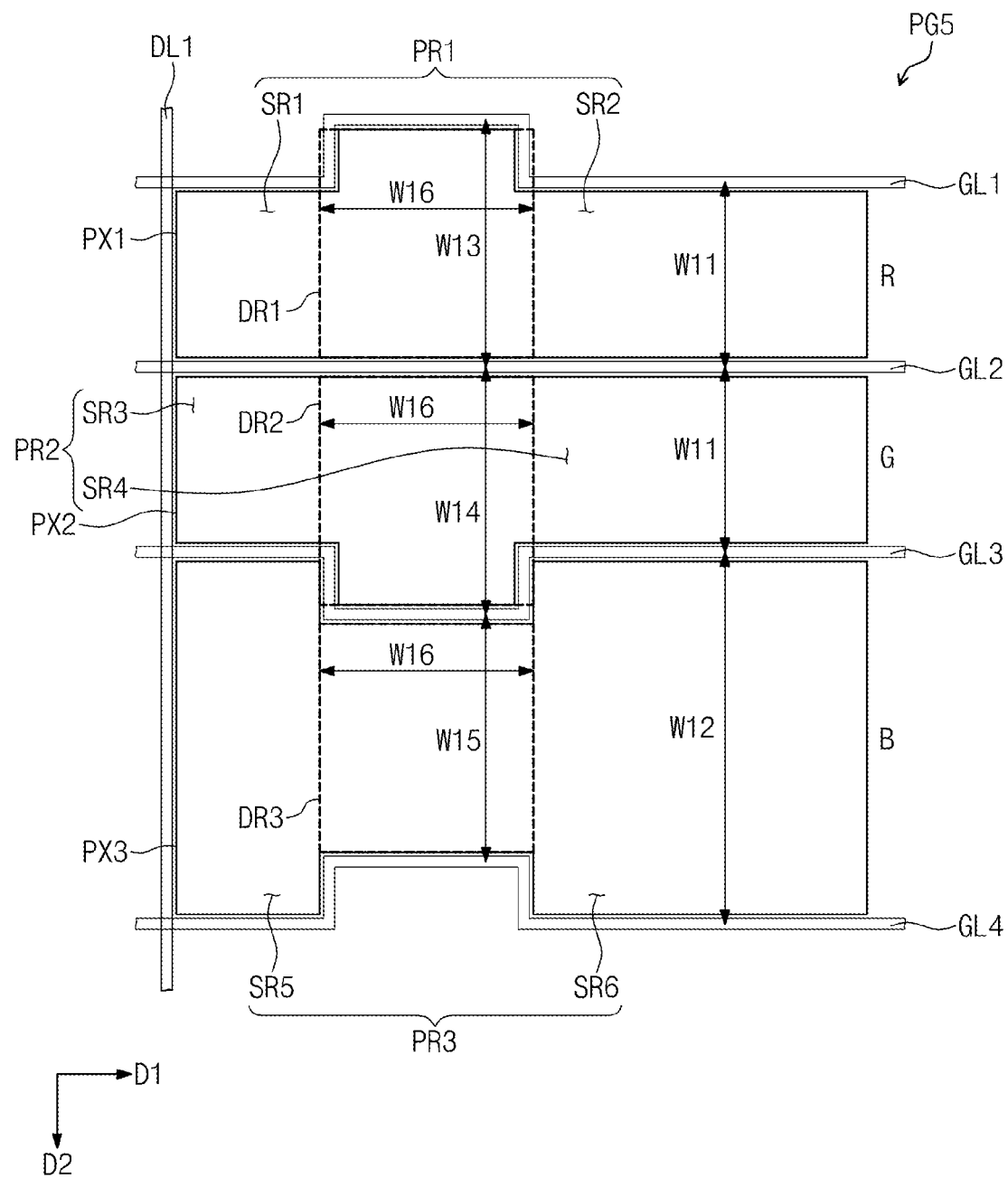
FIG. 11 is a plan view showing a first pixel group of a display panel according to another exemplary embodiment of the present disclosure.

FIG. 11 is a plan view showing a first pixel group PG5 of a display panel according to another exemplary embodiment of the present disclosure. FIG. 11 shows the first pixel group PG5 among pixel groups as a representative example since the pixel groups have the same structure and function. In addition, the first pixel group PG5 will be described in detail with reference to FIG. 11 and details of the others will be omitted in order to avoid redundancy.

Referring to FIG. 11, the first pixel group PG5 according to the present exemplary embodiment includes a first pixel PX1, a second pixel PX2, and a third pixel PX3, which are sequentially arranged in the column direction D2.

The first pixel PX1 is disposed between the first and second gate lines GL1 and GL2 and connected to the first data line DL1, the second pixel PX2 is disposed between the second and third gate lines GL2 and GL3 and connected to the first data line DL1, and the third pixel PX3 is disposed between the third and fourth gate lines GL3 and GL4 and connected to the first data line DL1. That is, the pixels arranged in the same column are connected to only one data line among two data lines adjacent thereto.

The first pixel PX1 displays a first color, e.g., a red color R, the second pixel PX2 displays a second color, e.g., a green color G, and the third pixel PX3 displays a third color, e.g., a blue color B. However, the colors displayed by the first, second, and third pixels PX1, PX2, and PX3 should not be limited to the red, green, and blue colors R, G, B. Among the first, second, and third pixels PX1, PX2, and PX3, at least one pixel has a size greater than that of other pixels. In the present exemplary embodiment, the third pixel PX3 displaying the blue color B has the size greater than that of the first and second pixels PX1 and PX2, but it should not be limited thereto or thereby. That is, the first pixel PX1 may have the size greater than that of the second and third pixels PX2 and PX3 or the second pixel PX2 may have the size greater than that of the first and third pixels PX1 and PX3.

Hereinafter, the structure that the third pixel PX3 has the size greater than that of the first and second pixels PX1 and PX2 will be described in detail as an example.

The first pixel PX1 includes a first sub-region PR1 and a second sub-region DR1, the second pixel PX2 includes a third sub-region PR2 and a fourth sub-region DR2, and the third pixel PX3 includes a fifth sub-region PR3 and a sixth sub-region DR3. Among the first, third, and fifth sub-regions PR1, PR2, and PR3, at least two sub-regions have different widths in the column direction D2. Hereinafter, the distance in the column direction D2 will be referred to as a vertical length.

As an example, the vertical length corresponds to a distance between a center of the gate line disposed at one side of a corresponding pixel and a center of the gate line disposed at the other side of the corresponding pixel, the center being measured in the column direction D2. In other words, the vertical length of the first pixel PX1 corresponds to the distance between the center of the first gate line GL1 and the center of the second data line DL2 measured along the column direction D2.

As an example, each of the first and third sub-regions PR1 and PR2 has a first vertical length W11 and the fifth sub-region PR3 has a second vertical length W12 greater than the first vertical length W11. The second vertical length W12 is two times greater than the first vertical length W11.

The second, fourth, and sixth sub-regions DR1, DR2, and DR3 are sequentially arranged in the column direction D2 and at least one sub-region of the second, fourth, and sixth sub-regions DR1, DR2, and DR3 is different from that of the other sub-regions of the corresponding pixel. That is, the second sub-region DR1 has the vertical length different from that of the first sub-region PR1, the fourth sub-region DR2 has the vertical length different from that of the third sub-region PR3, and the sixth sub-region DR3 has the vertical length different from that of the fifth sub-region PR3.

The second, fourth, and sixth sub-regions DR1, DR2, and DR3 have third, fourth, and fifth vertical lengths W12, W14, and W15, respectively. The third and fourth vertical widths W13 and W14 are different from the first vertical length W11 and the fifth vertical length W15 is different from the second vertical length W12. In the present exemplary embodiment, the third and fourth vertical length W13 and W14 are greater than the first vertical length W11 and the fifth vertical length W15 is smaller than the second vertical length W12.

In addition, the vertical lengths W13, W14, and W15 of the second, fourth, and sixth sub-regions DR1, DR2, and DR3 are substantially the same with each other. The second, fourth, and sixth sub-regions DR1, DR2, and DR3 have substantially the same horizontal width W16. Here, the horizontal width W16 indicates a width in the row direction D1.

The first sub-region PR1 is divided into two regions in the row direction D1 and includes first and second sub-pixel regions SR1 and SR2. Although not shown in FIG. 11, the first sub-pixel region SR1 includes a first sub-pixel electrode and the second sub-pixel region SR2 includes a second sub-pixel electrode. The second sub-region DR1 is disposed between the first and second sub-pixel regions SR1 and SR2. A driving device, e.g., a thin film transistor, may be disposed in the second sub-region DR1 to drive the first and second sub-pixel electrodes. Accordingly, since no image is displayed in the second sub-region DR1, the second sub-region DR1 may be covered by a black matrix (not shown).

The first and second sub-pixel regions SR1 and SR2 have the first vertical length W11 as their vertical length. The horizontal width of the first sub-pixel region SR1 is different from that of the second sub-pixel region SR2. For instance, the horizontal width of the second sub-pixel region SR2 is greater than the horizontal width of the first sub-pixel region SR1. Here, the horizontal width of the first sub-pixel region SR1 may correspond to the horizontal width of the first sub-pixel electrode and the horizontal width of the second sub-pixel region SR2 may correspond to the horizontal width of the second sub-pixel electrode.

The third sub-region PR2 is divided into two regions in the row direction D1 and includes third and fourth sub-pixel regions SR3 and SR4. Although not shown in FIG. 11, the third sub-pixel region SR3 includes a third sub-pixel electrode and the fourth sub-pixel region SR4 includes a fourth sub-pixel electrode. The fourth sub-region DR2 is disposed between the third and fourth sub-pixel regions SR3 and SR4. A driving device, e.g., a thin film transistor, may be disposed in the fourth sub-region DR2 to drive the third and fourth sub-pixel electrodes. Therefore, since no image is displayed in the fourth sub-region DR2, the fourth sub-region DR2 may be covered by the black matrix (not shown).

The third and fourth sub-pixel regions SR3 and SR4 have the vertical length W11 as their vertical length. The horizontal width of the third sub-pixel region SR3 is different from that of the fourth sub-pixel region SR4. For instance, the horizontal width of the fourth sub-pixel region SR4 is greater than the horizontal width of the third sub-pixel region SR3.

The fifth sub-region PR3 is divided into two regions in the row direction D1 and includes fifth and sixth sub-pixel regions SR5 and SR6. Although not shown in FIG. 11, the fifth sub-pixel region SR5 includes a fifth sub-pixel electrode and the sixth sub-pixel region SR6 includes a sixth sub-pixel electrode. The sixth sub-region DR3 is disposed between the fifth and sixth sub-pixel regions SR5 and SR6. A driving device, e.g., a thin film transistor, may be disposed in the sixth sub-region DR3 to drive the fifth and sixth sub-pixel electrodes. Thus, since no image is displayed in the sixth sub-region DR3, the sixth sub-region DR3 may be covered by the black matrix (not shown).

The fifth and sixth sub-pixel regions SR5 and SR6 have the second vertical length W12 as their vertical length. The horizontal width of the fifth sub-pixel region SR5 is different from that of the sixth sub-pixel region SR6. For instance, the horizontal width of the sixth sub-pixel region SR6 is greater than the horizontal width of the fifth sub-pixel region SR5. Here, the horizontal width of the fifth sub-pixel region SR5 may correspond to the horizontal width of the fifth sub-pixel electrode and the horizontal width of the sixth sub-pixel region SR6 may correspond to the horizontal width of the sixth sub-pixel electrode.

The first, third, and fifth sub-pixel regions SR1, SR3, and SR5 are sequentially arranged in the column direction D2 and have the same horizontal width. The second, fourth, and sixth sub-pixel regions SR2, SR4, and SR6 are sequentially arranged in the column direction D2 and have the same horizontal width.

The second sub-region DR1 has the vertical length W13 greater than the vertical length W11 of the first and second sub-pixel regions SR1 and SR2. Accordingly, the first pixel PX1 has a shape in which the second sub-region DR1 extends beyond an imaginary line that is flush with the first and second sub-pixel regions SR1 and SR2 in plan view. The fourth sub-region DR2 has the vertical length W14 greater than the vertical length W11 of the third and fourth sub-pixel regions SR3 and SR4. Therefore, the second pixel PX2 has a shape in which the fourth sub-region DR2 extends beyond an imaginary line that is flush with the third and fourth sub-pixel regions SR3 and SR4.

Here, the second sub-region DR1 of the first pixel PX1 and the fourth sub-region DR2 of the second pixel PX2 may extend in opposite directions.

The sixth sub-region DR3 has the vertical width W15 smaller than the vertical length W12 of the fifth and sixth sub-pixel regions SR5 and SR6. Therefore, the third pixel PX3 has a shape in which the sixth sub-region DR3 has a recessed portion that looks as though a rectangular portion has been cut out from an edge. In particular, upper and lower side portions of the third pixel PX3 are recessed. The fourth sub-region DR2 of the second pixel PX2 and a second sub-region DR1 of a first pixel PX1 of an adjacently-positioned pixel group are respectively accommodated in the upper and lower recessed side portions of the third pixel PX3. Thus, the second and fourth sub-regions DR1 and DR2 extend to the adjacent pixel, e.g., the third pixel PX3, to share the available space of the adjacent pixel. That is, the sub-region of the pixel having the relatively small vertical length extends in the available space of the pixel having the relatively large vertical length, and thus the pixels are disposed to share the spaces thereof.

Accordingly, the vertical length of the second and fourth sub-regions DR1 and DR2 may be prevented from increasing, and as a result, the aperture ratio of the first and second pixels PX1 and PX2 may be improved.

According to FIG. 11, the second gate line GL2 extends substantially straight in the row direction D1 between the first pixel PX1 and the second pixel PX2. The first gate line GL1, which is positioned between the first pixel PX1 and the adjacent pixel group, extends substantially in the row direction D1 but has a bent portion in the second sub-region DR1. Specifically, the bent portion forms a "step" toward the adjacent pixel group, away from the second gate line GL2. A third gate line GL3, which is positioned between the second pixel PX2 and the third pixel PX3, has a bent portion in the fourth sub-region DR2. Specifically, the bent portion bends toward the third pixel PX3 to form a "step." In particular, the first gate line GL1 bends at a position adjacent to the second sub-region DR1 to increase the width of the second sub-region DR1. A distance between the first and second gate lines GL1 and GL2 in the first sub-region DR1 is greater than a distance between the first and second gate lines GL1 and GL2 in the first and second sub-pixel regions SR1 and SR2. Similarly, the third gate line GL3 bends to the lower direction at a position adjacent to the fourth sub-region DR2 to increase the width of the fourth sub-region DR2. A distance between the second and third gate lines GL2 and GL3 in the fourth sub-region DR2 is greater than a distance between the second and third gate lines GL2 and GL3 in the third and fourth sub-pixel regions SR3 and SR4.

Figure 12:
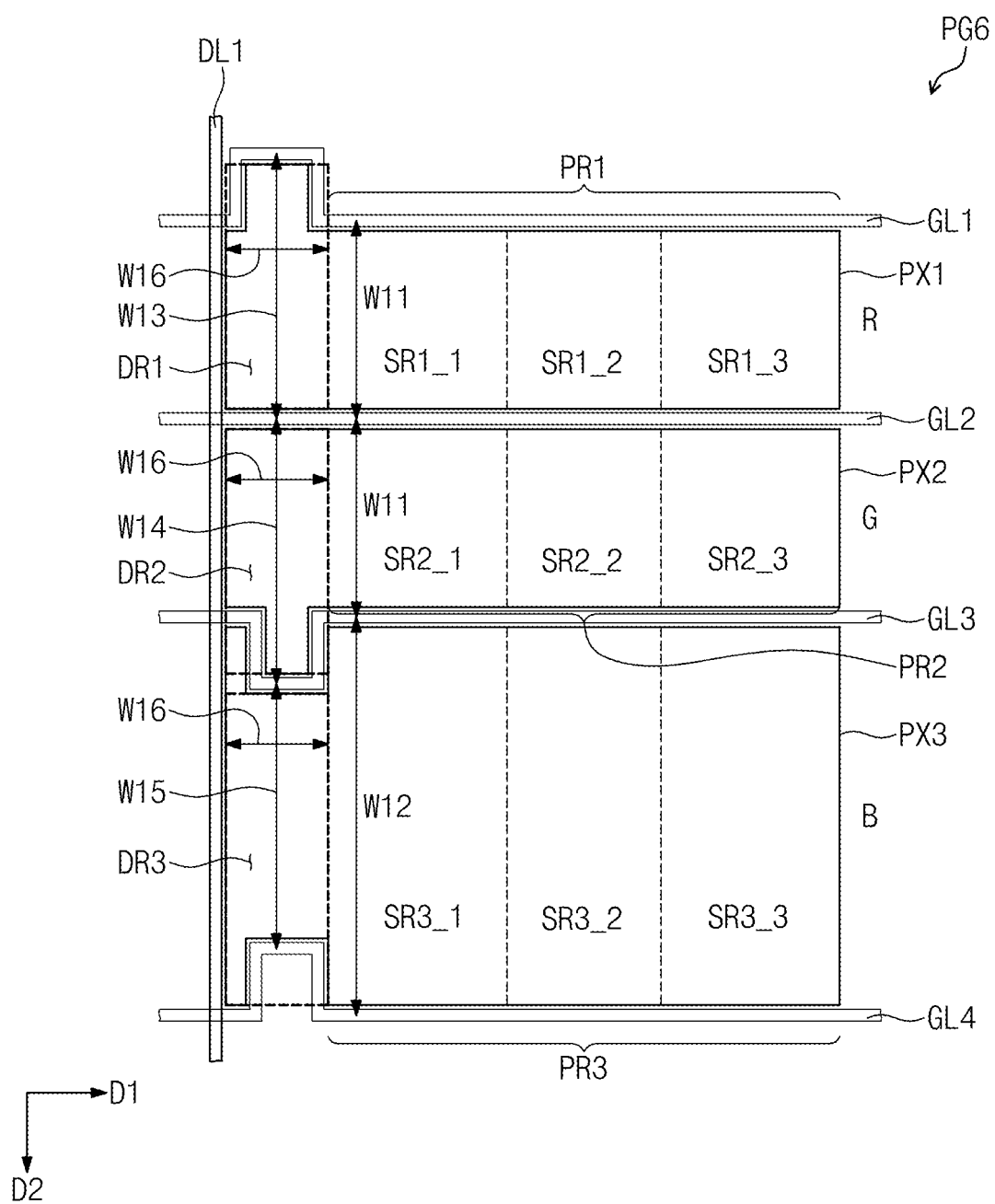
FIG. 12 is a plan view showing a first pixel group of a display panel according to another exemplary embodiment of the present disclosure.

FIG. 12 is a plan view showing a first pixel group PG6 of a display panel according to another exemplary embodiment of the present disclosure. FIG. 12 shows the first pixel group PG6 among pixel groups as a representative example since the pixel groups have the same structure and function. In addition, the first pixel group PG6 will be described in detail with reference to FIG. 12 and details of the others will be omitted in order to avoid redundancy.

Referring to FIG. 12, the first pixel group PG6 according to the present exemplary embodiment includes a first pixel PX1, a second pixel PX2, and a third pixel PX3, which are sequentially arranged in the column direction D2. The first pixel PX1 is disposed between the first and second gate lines GL1 and GL2 and connected to the first data line DL1, the second pixel PX2 is disposed between the second and third gate lines GL2 and GL3 and connected to the first data line DL1, and the third pixel PX3 is disposed between the third and fourth gate lines GL3 and GL4 and connected to the first data line DL1. That is, the pixels arranged in the same column are connected to only one data line among two data lines adjacent thereto.

The first pixel PX1 includes a first sub-region PR1 and a second sub-region DR1, the second pixel PX2 includes a third sub-region PR2 and a fourth sub-region DR2, and the third pixel PX3 includes a fifth sub-region PR3 and a sixth sub-region DR3.

In the embodiment shown, each of the first and third sub-regions PR1 and PR2 has a first vertical length W11 and the fifth sub-region PR3 has a second vertical length W12 greater than the first vertical length W11. The second vertical length W12 is two times greater than the first vertical length W11.

The second, fourth, and sixth sub-regions DR1, DR2, and DR3 are sequentially arranged in the column direction D2 and a vertical length of a driving region of at least one sub-region of the second, fourth, and sixth sub-regions DR1, DR2, and DR3 is different from that of the other sub-regions of the corresponding pixel. The second, fourth, and sixth sub-regions DR1, DR2, and DR3 have third, fourth, and fifth vertical widths W13, W14, and W15, respectively. The third and fourth vertical lengths W13 and W14 are different from the first vertical length W11 and the fifth vertical length W15 is different from the second vertical width W12. In the present exemplary embodiment, the third and fourth vertical lengths W13 and W14 are greater than the first vertical length W11 and the fifth vertical length W15 is smaller than the second vertical length W12. In addition, the vertical lengths W13, W14, and W15 of the second, fourth, and sixth sub-regions DR1, DR2, and DR3 are substantially the same with each other. The second, fourth, and sixth sub-regions DR1, DR2, and DR3 have substantially the same horizontal width W16.

The first sub-region PR1 includes first, second, and third sub-pixel regions SR1_1, SR1_2, and SR1_3 sequentially arranged in the row direction D1. The second sub-region DR1 is disposed adjacent to the first sub-pixel region SR1_1 or the third sub-pixel region SR1_3. Each of the first, second, and third sub-pixel regions SR1_1, SR1_2, and SR1_3 has the first vertical with W11 as their vertical length.

The third sub-region PR2 includes fourth, fifth, and sixth sub-pixel regions SR2_1, SR2_2, and SR2_3 sequentially arranged in the row direction D1. The fourth sub-region DR2 is disposed adjacent to the fourth sub-pixel region SR2_1 or the sixth sub-pixel region SR2_3. Each of the fourth, fifth, and sixth sub-pixel regions SR2_1, SR2_2, and SR2_3 has the first vertical length W11 as their vertical length.

The fifth sub-region PR3 includes seventh, eighth, and ninth sub-pixel regions SR3_1, SR3_2, and SR3_3 sequentially arranged in the row direction D1. The sixth sub-region DR3 is disposed adjacent to the seventh sub-pixel region SR3_1 or the ninth sub-pixel region SR3_3. Each of the seventh, eighth, and ninth sub-pixel regions SR3_1, SR3_2, and SR3_3 has the second vertical with W12 as their vertical length.

Since the second sub-region DR1 has a third vertical width W13 greater than the first vertical length W11 of the first, second, and third sub-pixel regions SR1_1, SR1_2, and SR1_3, the first pixel PX1 has a shape in which the second sub-region DR1 extends beyond an imaginary line that is flush with the first sub-region PR1 in plan view. The fourth sub-region DR2 has a fourth vertical length W14 greater than the first vertical length W11 of the fourth, fifth, and sixth sub-pixel regions SR2_1, SR2_2, and SR2_3, the second pixel PX2 has a shape in which the fourth sub-region DR2 extends beyond an imaginary line that is flush with the second sub-region PR2.

Here, the second sub-region DR1 of the first pixel PX1 and the fourth sub-region DR2 of the second pixel PX2 extend in opposite directions.

The sixth sub-region DR3 has a fifth vertical length W15 smaller than the second vertical length W12 of the seventh, eighth, and ninth sub-pixel regions SR3_1, SR3_2, and SR3_3. The recessed portion formed close to the second pixel PX2 and the recessed portion that is formed close to the first pixel PX1 of an adjacently-positioned pixel group may be aligned such that they extend toward each other. Therefore, the third pixel PX3 has a "neck" portion formed by the two recessed portions facing each other in the sixth sub-region DR3, the "neck" portion being narrower than the third pixel PX3 than seventh, eighth, and ninth sub-pixel regions SR3_1, SR3_2, and SR3_3 in the column direction D2. In reference to FIG. 12, upper and lower side portions of the third pixel PX3 are recessed. The fourth sub-region DR2 of the second pixel PX2 and a second sub-region DR1 of a first pixel PX1 of a next pixel group are respectively accommodated in the upper and lower recessed side portions of the third pixel PX3. Thus, the second and fourth sub-regions DR1 and DR2 may be disposed in the available space of the adjacent pixel, e.g., the third pixel PX3. That is, the sub-region of the pixel having the relatively small vertical length extends in the available space of the pixel having the relatively large vertical length, and thus the pixels are disposed to share the spaces thereof Accordingly, the horizontal width of the second and fourth sub-regions DR1 and DR2 may be prevented from increasing. As a result, the aperture ratio of the first and second pixels PX1 and PX2 may be improved.

Figure 13:
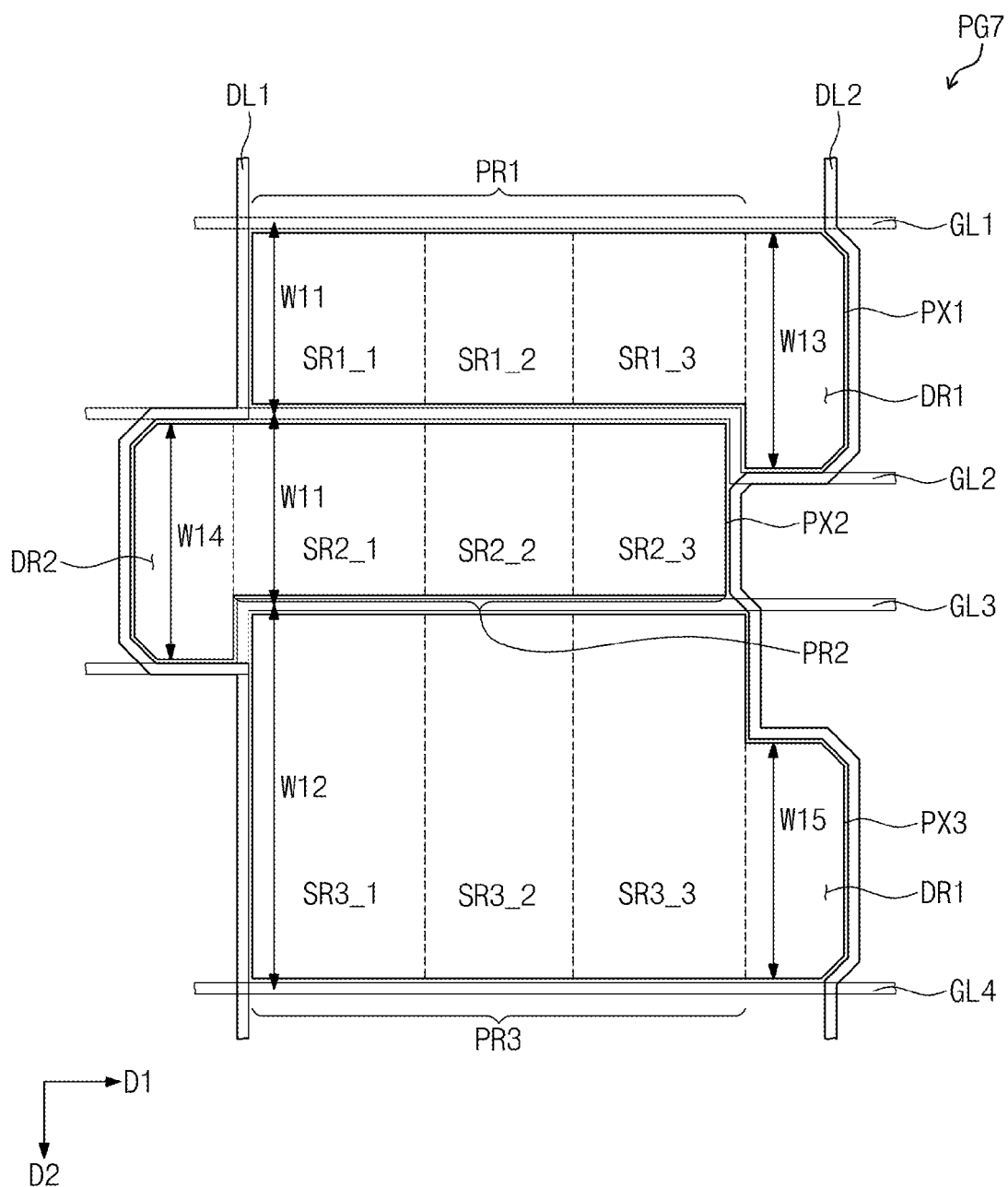
FIG. 13 is a plan view showing a first pixel group of a display panel according to another exemplary embodiment of the present disclosure.

FIG. 13 is a plan view showing a first pixel group PG7 of a display panel according to another exemplary embodiment of the present disclosure.

Referring to FIG. 13, the first pixel group PG7 according to the present exemplary embodiment includes a first pixel PX1, a second pixel PX2, and a third pixel PX3, which are sequentially arranged in the column direction D2. The first pixel PX1 is disposed between the first and second gate lines GL1 and GL2 and connected to the second data line DL2, the second pixel PX2 is disposed between the second and third gate lines GL2 and GL3 and connected to the first data line DL1, and the third pixel PX3 is disposed between the third and fourth gate lines GL3 and GL4 and connected to the second data line DL2. That is, the pixels arranged in the same column are alternately connected to two data lines in the unit of row.

In the first pixel PX1, the second sub-region DR1 is disposed adjacent to the third sub-region SR1_3 and connected to the second data line DL2.

Since the second sub-region DR1 has a vertical length W13 greater than a vertical length W11 of the first, second, and third sub-pixel regions SR1_1, SR1_2, and SR1_3, the first pixel PX1 has a shape in which the second sub-region DR1 extends beyond an imaginary line that is flush with the third, sixth, and ninth sub-pixel regions SR1_3, SR2_3, and SR3_3. In particular, the second sub-region DR1 protrudes in the column direction D2 from the third sub-pixel region SR1_3.

In the second pixel PX2, the fourth sub-region DR2 is disposed adjacent to the fourth sub-pixel region SR2_1 and connected to the first data line DL1. Since the fourth sub-region DR2 has a vertical length W14 greater than the vertical length W11 of the fourth, fifth, and sixth sub-pixel regions SR2_1, SR2_2, and SR2_3, the second pixel PX2 has a shape in which the fourth sub-region DR2 extends beyond an imaginary line that is flush with the first sub-pixel region SR1_1, the fourth sub-pixel region SR2_1, and the seventh sub-pixel region SR3_1. In particular, the fourth sub-region DR2 protrudes in the column direction D2, but in the opposite direction as the second sub-region DR1, from the fourth sub-pixel region SR2_1.

In the third pixel PX3, the sixth sub-region DR3 is disposed adjacent to the ninth sub-pixel region SR3_3 and connected to the second data line DL2. Since the sixth sub-region DR3 has a vertical length W15 smaller than the vertical length W12 of the seventh, eighth, and ninth sub-pixel regions SR3_1, SR3_2, and SR3_3, the third pixel PX3 has a shape in which the sixth sub-region DR3 is more inwardly recessed than the ninth sub-pixel regions SR3_3 when viewed in a plan view.

Accordingly, the second, fourth, and sixth sub-regions DR1, DR2, and DR3 of the first, second, and third pixels PX1, PX2, and PX3 may be arranged in a zigzag shape in one pixel column in which the first, second, and third pixels PX1, PX2, and are arranged in the column direction D2.

Figure 14:
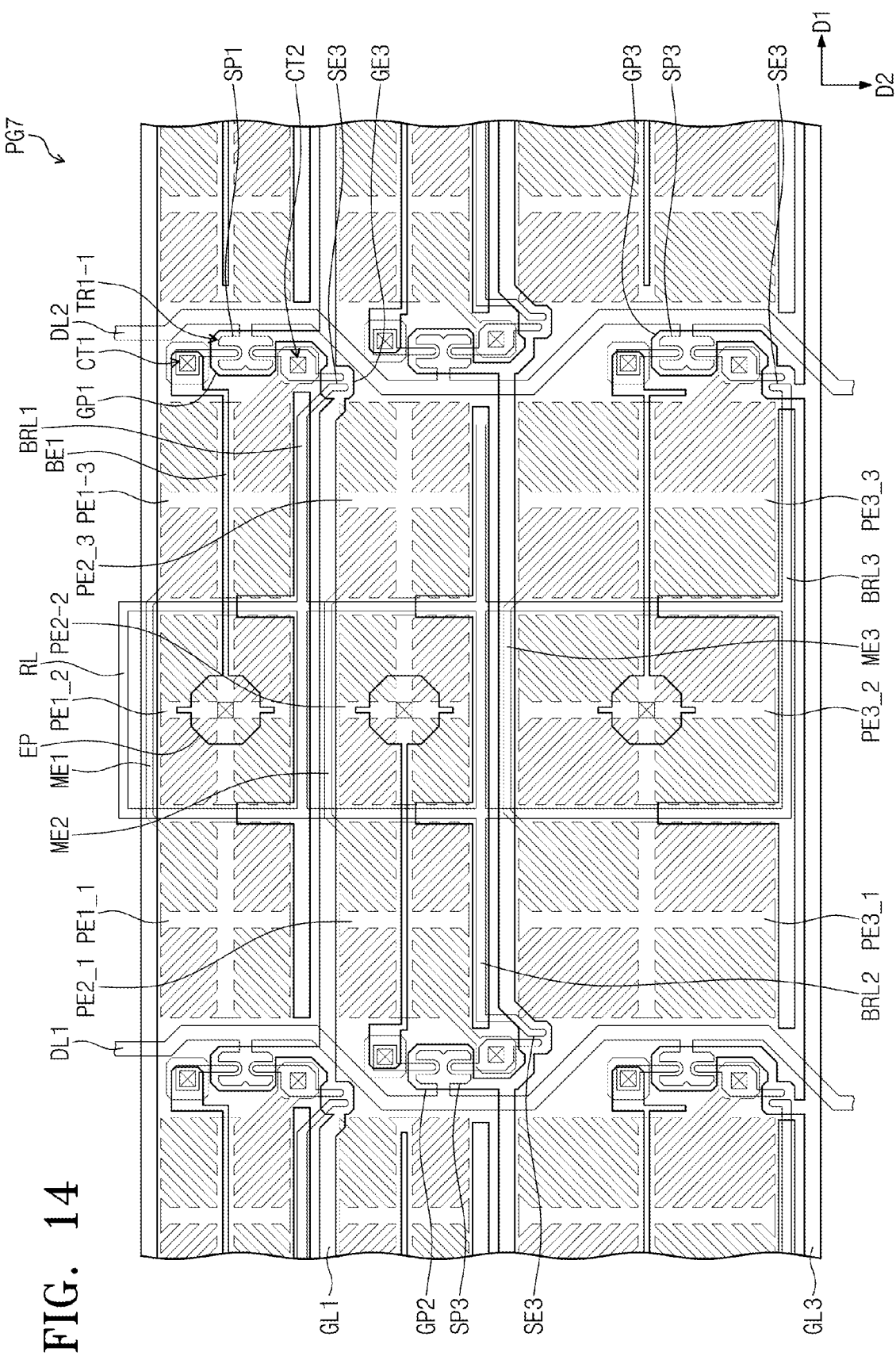
FIG. 14 is a layout diagram showing a first pixel group shown in FIG. 13.

FIG. 14 is a layout diagram showing the first pixel group PG7 shown in FIG. 13.

Referring to FIG. 14, the first pixel group PG7 includes the first to third pixels PX1 to PX3 arranged in the column direction D2. The display apparatus further includes the first, second, and third gate lines GL1, GL2, and GL3 connected to the first pixel group PG7 and the first and second data lines DL1 and DL2. The first to third gate lines GL1 to GL3 extend in the row direction D1 and the first and second data lines DL1 and DL2 extend in the column direction D2. The display apparatus further includes a voltage line RL disposed between the first and second data lines DL1 and DL2 and connected to the first pixel group PG7.

The first pixel PX1 includes first, second, and third pixel electrodes PE1_1, PE1_2, and PE1_3 respectively disposed in the first, second, and third sub-pixel regions SR1_1, SR1_2, and SR1_3, and the first and third sub-pixel electrodes PE1_1 and PE1_3 are electrically connected to each other by a first connection electrode MEL The second sub-region DR1 is disposed between the third sub-pixel electrode PE1_3 and the second data line DL2.

The second pixel PX2 includes fourth, fifth, and sixth pixel electrodes PE2_1, PE2_2, and PE2_3 respectively disposed in the fourth, fifth, and sixth sub-pixel regions SR2_1, SR2_2, and SR2_3, and the fourth and sixth sub-pixel electrodes PE2_1 and PE2_3 are electrically connected to each other by a second connection electrode ME2. The fourth sub-region DR2 is disposed between the fourth sub-pixel electrode PE2_1 and the first data line DL1.

The third pixel PX3 includes seventh, eighth, and ninth pixel electrodes PE3_1, PE3_2, and PE3_3 respectively disposed in the seventh, eighth, and ninth sub-pixel regions SR3_1, SR3_2, and SR3_3, and the seventh and ninth sub-pixel electrodes PE3_1 and PE3_3 are electrically connected to each other by a third connection electrode ME3. The sixth sub-region DR3 is disposed between the ninth sub-pixel electrode PE3_3 and the second data line DL2.

The first gate line GL1 is disposed between the first and second pixels PX1 and PX2, the second gate line GL2 is disposed between the second and third pixels PX2 and PX3, and the third gate line GL3 is disposed between the third pixel PX3 and a first pixel of an adjacent pixel group (not shown).

A first gate electrode part GP1 extending from the first gate line GL1 is disposed in the second sub-region DR1, a second gate electrode part GP2 extending from the second gate line GL2 is disposed in the fourth sub-region DR2, and a third gate electrode part GP3 extending from the third gate line GL3 is disposed in the sixth sub-region DR3.

The first gate electrode part GP1 is used as the first and second gate electrodes of the first and second transistors TR1_1 and TR1_2 of the first pixel PX1. A portion of the first gate line GL1 is used as the third gate electrode GE3 of the third transistor TR1_3 of the first pixel PX1.

A first source electrode part SP1 branched from the second data line DL2 is disposed in the second sub-region DR1. The first source electrode part SP1 is used as the first and second source electrodes of the first and second transistors TR1_1 and TR1_2 of the first pixel PX1. The first source electrode part SP1 is disposed on the first gate electrode part GP1. The first drain electrode of the first transistor TR1_1 is disposed on the first gate electrode part GP1 and spaced apart from the first source electrode part SP1, and the second drain electrode of the second transistor TR1_2 is disposed on the first gate electrode part GP1 and spaced apart from the first source electrode part SP1.

The first drain electrode of the first transistor TR1_1 is electrically connected to a bridge electrode BE1 through a first contact part CT1. The bridge electrode BE1 overlaps the first drain electrode in the first contact part CT1 and extends along the first gate line GL1. The bridge electrode BE1 expands in the second sub-pixel region SR1_2, and thus an expansion part EP overlaps the second sub-pixel electrode PE1_2 is formed. The bridge electrode BE1 and the second sub-pixel electrode PE1_2 electrically make contact with each other.

The second drain electrode of the second transistor TR1_2 is electrically connected to the third sub-pixel electrode PE1_3 through a second contact part CT2. Since the third sub-pixel electrode PE1_3 is electrically connected to the first sub-pixel electrode PE1_1 through the first connection electrode MEL a signal output from the second drain electrode of the second transistor TR1_2 is applied to the first sub-pixel electrode PE1_1 via the third sub-pixel electrode PE1_3 and the first connection electrode MEL The first and second contact parts CT1 and CT2 are disposed in the second sub-region DR1.

The third source electrode and the third drain electrode of the third transistor TR1_3 are disposed on the third gate electrode GE3 of the third transistor TR1_3. The third drain electrode of the third transistor TR1_3 extends from the second drain electrode of the second transistor TR1_2. The third source electrode of the third transistor TR1_3 is branched from the voltage line RL and disposed on the third gate electrode GE3 to be spaced apart from the third drain electrode of the third transistor TR1_3.

The fourth and sixth sub-regions DR2 and DR3 have substantially the same structure as that of the second sub-region DR1 except for their positions, and thus detailed descriptions of the layout of the fourth and sixth sub-regions DR2 and DR3 will be omitted.

The voltage line RL extends in the column direction D2 through a boundary portion between the first and second sub-pixel regions SR1_1 and SR1_2 and a boundary portion between the second and third sub-pixel regions SR1_2 and SR1_3. The voltage line RL includes a first branch voltage line BRL1 extending to the second sub-region DR1 in the boundary portion of the first and second pixels PX1 and PX2, a second branch voltage line BRL2 extending to the fourth sub-region DR2 in the boundary portion of the second and fourth pixels PX2 and PX3, and a third branch voltage line BRL3 extending to the sixth sub-region DR3 in the boundary portion of the third pixel PX3 and a pixel adjacent to the third pixel PX3 in the column direction D2.

The first branch voltage line BRL1 is branched toward the second sub-region DR1 and electrically connected to the third source electrode SE3 of the third transistor TR1_3 of the first pixel PX1. The second branch voltage line BRL2 is branched toward the fourth sub-region DR2 and electrically connected to the third source electrode SE3 of the third transistor TR1_3 of the second pixel PX2. The third branch voltage line BRL3 is branched toward the sixth sub-region DR3 and electrically connected to the third source electrode SE3 of the third transistor TR1_3 of the first pixel PX1.

Each of the first and second data lines DL1 and DL2 is bent to have a zigzag shape.

Figure 15:
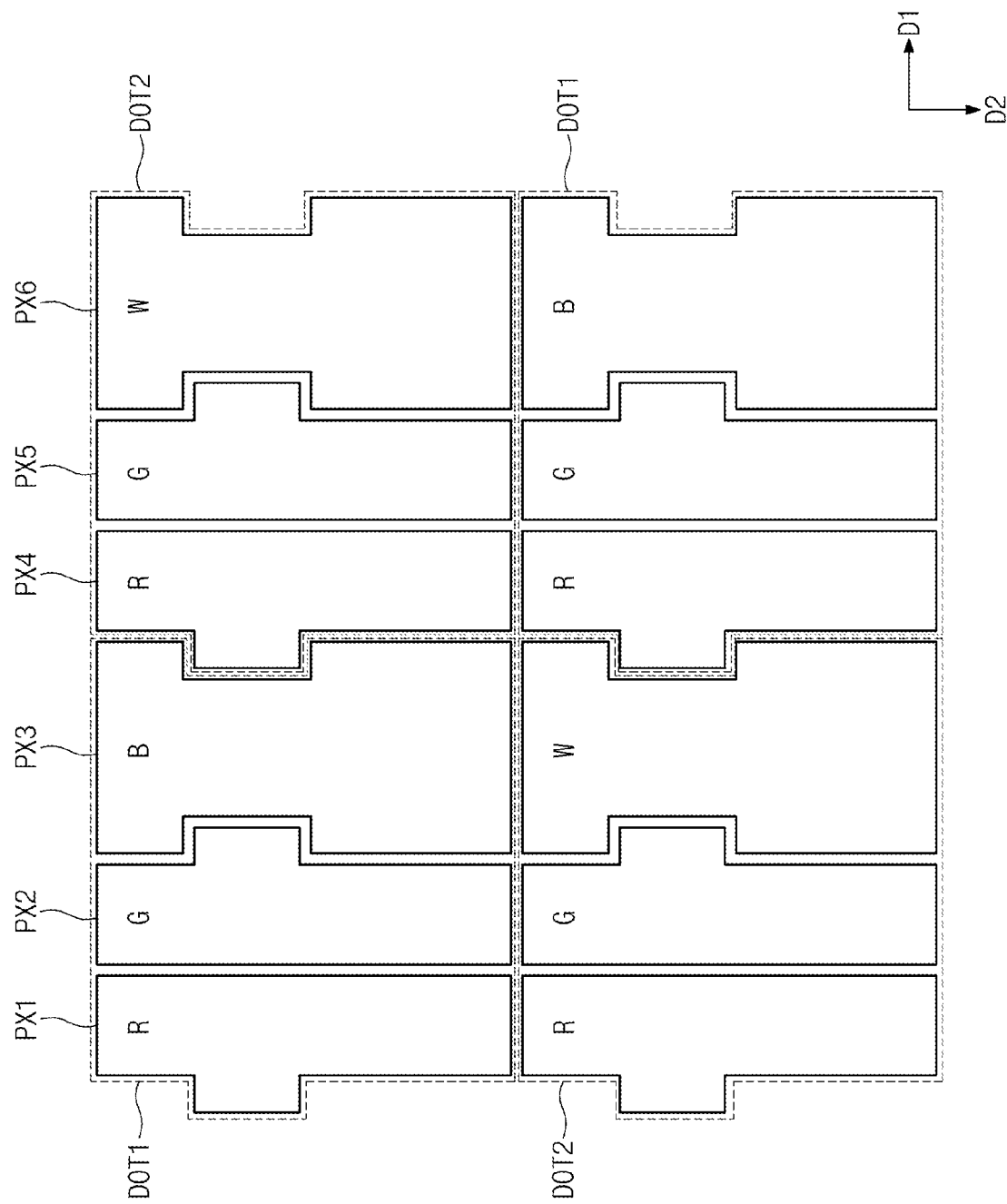
FIG. 15 is a plan view showing first and second dots of a display panel according to another exemplary embodiment of the present disclosure.

FIG. 15 is a plan view showing first and second dots of a display panel according to another exemplary embodiment of the present disclosure.

Referring to FIG. 15, the display panel according to the present exemplary embodiment includes first and second dots DOT1 and DOT2. The first dot DOT1 includes first, second, and third pixels PX1, PX2, and PX3 and the second dot DOT2 includes fourth, fifth, and sixth pixels PX4, PX5, and PX6. The first and second dots DOT1 and DOT2 are alternately arranged with each other in the row direction D1 and the column direction D2.

In the first dot DOT1, the first, second, and third pixels PX1, PX2, and PX3 are sequentially arranged in the row direction D1 and at least one of the first, second, and third pixels PX1, PX2, and PX3 has a size greater than that of the other pixels. As an example, the first pixel PX1 displays a first color, e.g., a red color R, the second pixel PX2 displays a second color, e.g., a green color G, and the third pixel PX3 displays a third color, e.g., a blue color B. In the present exemplary embodiment, the third pixel PX3 displaying the blue color B has the size greater than that of the first and second pixels PX1 and PX2 as shown in FIG. 15, but it should not be limited thereto.

In the second dot DOT2, the fourth, fifth, and sixth pixels PX4, PX5, and PX6 are sequentially arranged in the row direction D1 and at least one of the fourth, fifth, and sixth pixels PX1, PX2, and PX3 has a size greater than that of the other pixels. As an example, the fourth pixel PX4 displays a fourth color, e.g., the red color R, the fifth pixel PX5 displays a fifth color, e.g., the green color G, and the sixth pixel PX6 displays a sixth color, e.g., a white color W. In the present exemplary embodiment, the sixth pixel PX6 displaying the white color W has the size greater than that of the fourth and fifth pixels PX4 and PX5 as shown in FIG. 15, but it should not be limited thereto or thereby.

The first and second dots DOT1 and DOT2 have substantially the same pixel structure except for the colors. Accordingly, the pixel structure of the first and second dots DOT1 and DOT2 is substantially the same as that shown in FIGS. 2 to 6, and thus detailed descriptions of the first and second dots DOT1 and DOT2 will be omitted.

Figure 16:
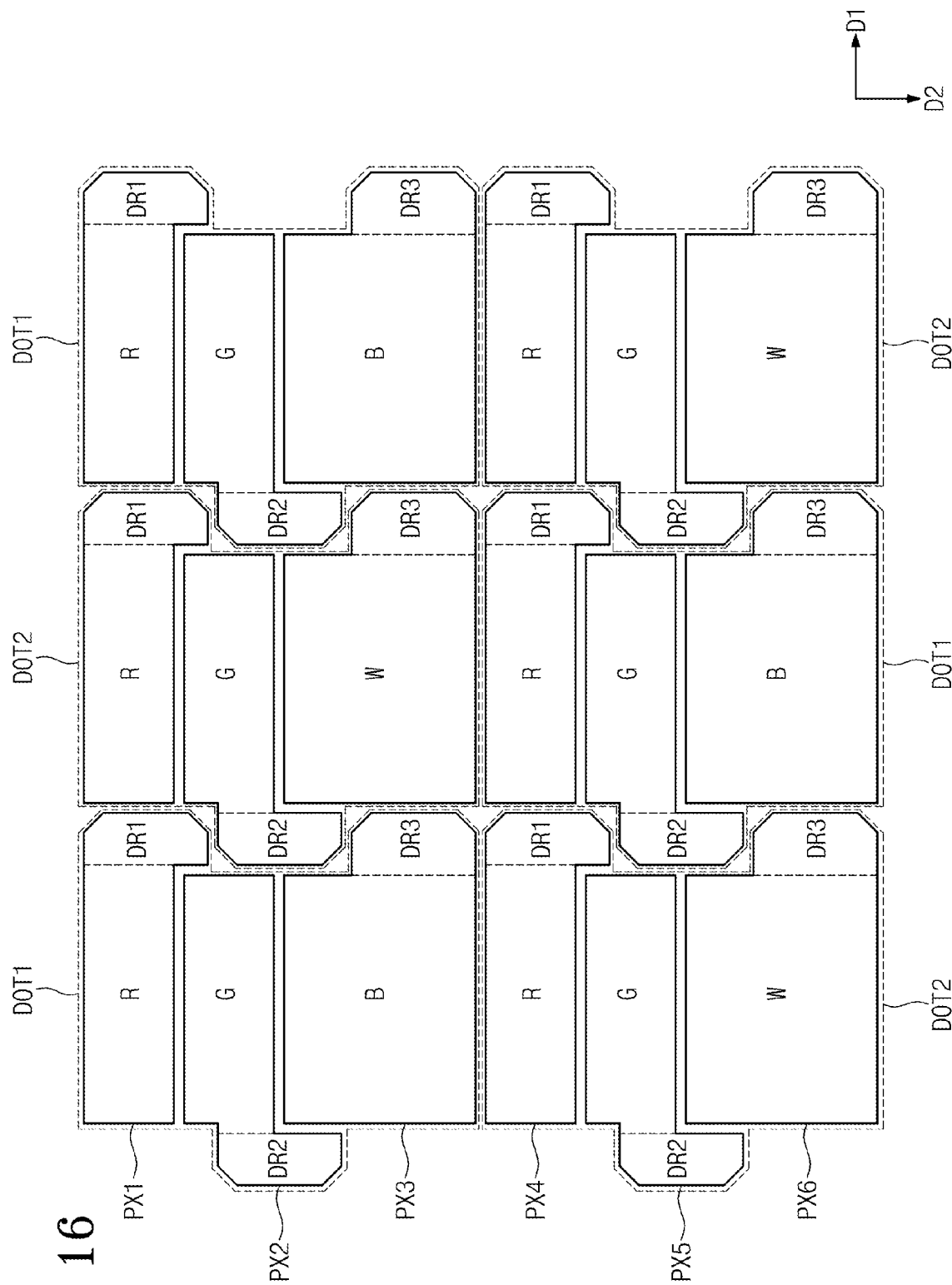
FIG. 16 is a plan view showing first and second dots of a display panel according to another exemplary embodiment of the present disclosure.

FIG. 16 is a plan view showing first and second dots of a display panel according to another exemplary embodiment of the present disclosure.

Referring to FIG. 16, the display panel according to the present exemplary embodiment includes first and second dots DOT1 and DOT2. The first dot DOT1 includes first, second, and third pixels PX1, PX2, and PX3 and the second dot DOT2 includes fourth, fifth, and sixth pixels PX4, PX5, and PX6. The first and second dots DOT1 and DOT2 are alternately arranged with each other in the row direction D1 and the column direction D2.

In the first dot DOT1, the first, second, and third pixels PX1, PX2, and PX3 are sequentially arranged in the column direction D2 and at least one of the first, second, and third pixels PX1, PX2, and PX3 has a size greater than that of the other pixels. As an example, the first pixel PX1 displays a first color, e.g., a red color R, the second pixel PX2 displays a second color, e.g., a green color G, and the third pixel PX3 displays a third color, e.g., a blue color B. In the present exemplary embodiment, the third pixel PX3 displaying the blue color B has the size greater than that of the first and second pixels PX1 and PX2 as shown in FIG. 16.

In the second dot DOT2, the fourth, fifth, and sixth pixels PX4, PX5, and PX6 are sequentially arranged in the column direction D2 and at least one of the fourth, fifth, and sixth pixels PX1, PX2, and PX3 has a size greater than that of the other pixels. As an example, the fourth pixel PX4 displays a fourth color, e.g., the red color R, the fifth pixel PX5 displays a fifth color, e.g., the green color G, and the sixth pixel PX6 displays a sixth color, e.g., the white color W. In the present exemplary embodiment, the sixth pixel PX6 displaying the white color W has the size greater than that of the fourth and fifth pixels PX4 and PX5 as shown in FIG. 16.

The first and second dots DOT1 and DOT2 have substantially the same pixel structure except for the colors. Accordingly, the pixel structure of the first and second dots DOT1 and DOT2 is substantially the same as that shown in FIGS. 13 and 14, and thus detailed descriptions of the first and second dots DOT1 and DOT2 will be omitted.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A display apparatus having a pixel group, the pixel group comprising:
a first pixel comprising a first sub-region and a second sub-region;
a second pixel comprising a third sub-region and a fourth sub-region; and
a third pixel comprising a fifth sub-region and a sixth sub-region, wherein the first, second, and third pixels are sequentially arranged in a first direction, at least two sub-regions of the first, third, and fifth sub-regions have different widths in the first direction, the second, fourth, and sixth sub-regions are sequentially arranged in the first direction, and at least one sub-region of the second, fourth, and sixth sub-regions expands toward an adjacent sub-region in the first direction and has a width greater than a width of at least one other sub-region of the first, third, and fifth sub-regions in the same pixel in which the at least one sub-region is included,
wherein no image is displayed in at least one of the second, fourth, and sixth sub-regions,
wherein the first sub-region is divided by the second sub-region into a first sub-pixel region and a second sub-pixel region, or comprised of the first sub-pixel region, the second sub-pixel region, and a third sub-pixel region sequentially arranged in a second direction perpendicular to the first direction, wherein, when the first sub-region is divided by the second sub-region, the first and second sub-pixel regions respectively comprise a first sub-pixel electrode of a first sub-pixel and a second sub-pixel electrode of a second sub-pixel, the first and second sub-pixel electrodes driven by at least one thin film transistor included in the second sub-region, wherein among the first, second, and third pixels, the largest pixel has a recessed portion, and at least one sub-region of the second, fourth, and sixth sub-regions expands into the recessed portion, wherein the first and third sub-regions have a first width in the first direction, the fifth sub-region has a second width in the first direction, and the second width is greater than the first width, wherein the second sub-region has a third width in the first direction, the fourth sub-region has a fourth width in the first direction, the third and fourth widths are greater than the first width, the sixth sub-region has a fifth width in the first direction, and the fifth width is smaller than the second width.

2. The display apparatus of claim 1, wherein the first, third, and fifth sub-regions comprise a pixel electrode and the second, fourth, and sixth sub-regions comprise a thin film transistor to drive the pixel electrode.

3. The display apparatus of claim 2, further comprising first, second, third, and fourth data lines sequentially arranged in the first direction, wherein the first pixel is disposed between the first and second data lines and connected to one of the first and second data lines, the second pixel is disposed between the second and third data lines and connected to one of the second and third data lines, and the third pixel is disposed between the third and fourth data lines and connected to one of the third and fourth data lines.

4. The display apparatus of claim 3, wherein a width in the first direction of each of the first to sixth sub-regions is a distance between a center of the data line disposed at one side of the respective first, second or third pixel and a center of the data line disposed at an other side of respective first, second or third the pixel, wherein the center is determined along the first direction.

5. The display apparatus of claim 1, wherein the second width is about two times greater than the first width.

6. The display apparatus of claim 1, wherein the third, fourth, and fifth widths are substantially the same.

7. The display apparatus of claim 1, wherein the second, fourth, and sixth sub-regions have substantially the same length in the second direction.

8. The display apparatus of claim 1, wherein the first, second, and third pixels display first, second, and third colors, respectively, and each of the first, second, and third colors is one of red, green, and blue colors.

9. The display apparatus of claim 1, wherein each of the first, second, and third pixels comprises:
a first sub-pixel charged with a first pixel voltage; and
a second sub-pixel charged with a second pixel voltage having a level different from the first pixel voltage.

10. The display apparatus of claim 9, wherein the first sub-region comprises first and second sub-pixel regions, the third sub-region comprises third and fourth sub-pixel regions, and the fifth sub-region comprises fifth and sixth sub-pixel regions,
wherein each of the first, third, and fifth sub-pixel regions comprises a first sub-pixel electrode of the first sub-pixel and each of the second, fourth, and sixth sub-pixel regions comprises a second sub-pixel electrode of the second sub-pixel.

11. The display apparatus of claim 10, wherein each of the second, fourth, and sixth sub-regions comprises thin film transistors to respectively apply the first and second pixel voltages to the first and second sub-pixel electrodes.

12. The display apparatus of claim 10, wherein the first, third, and fifth sub-pixel regions are sequentially arranged in the first direction, the second, fourth, and sixth sub-pixel regions are sequentially arranged in the first direction, the second sub-region is disposed between the first and second sub-pixel regions, the fourth sub-region is disposed between the third and fourth sub-pixel regions, and the sixth sub-region is disposed between the fifth and sixth sub-pixel regions.

13. The display apparatus of claim 10, further comprising:
a first gate line extending in the first direction; and
first, second, and third data lines extending in a second direction substantially perpendicular to the first direction and respectively being connected to the first, second, and third pixels.

14. The display apparatus of claim 13, further comprising:
a first voltage line extending in the second direction, disposed between the first and second data lines, and connected to the first pixel;
a second voltage line extending in the second direction, disposed between the second and third data lines, and connected to the second pixel; and
a third voltage line extending in the second direction, disposed between the third and fourth data lines, and connected to the third pixel.

15. The display apparatus of claim 14, wherein the first voltage line is disposed at a position corresponding to a half of a distance between the first and second data lines in the first and second sub-pixel regions and disposed closer to the second data line than the first data line in the second sub-region, the second voltage line is disposed at a position corresponding to half of a distance between the second and third data lines in the third and fourth sub-pixel regions and disposed closer to the third data line than the second data line in the fourth sub-region, and the third voltage line is disposed at a position corresponding to half of a distance between the third and fourth data lines in the fifth and sixth sub-pixel regions and disposed closer to the fourth data line than the third data line in the sixth sub-region.

16. The display apparatus of claim 15, wherein the first data line and the first voltage line are bent in opposite directions with respect to each other in the second sub-region, the second voltage line and the third data line are bent in a same direction, and the fourth data line and the third voltage line are bent in opposite directions with respect to each other.

* * * * *